(12) United States Patent
Delaney et al.

(10) Patent No.: US 10,366,065 B2
(45) Date of Patent: Jul. 30, 2019

(54) MEMORY EFFICIENT LOOKUP STRUCTURE

(71) Applicant: NetApp, Inc., Sunnyvale, CA (US)

(72) Inventors: William P. Delaney, Wichita, KS (US); Joseph Blount, Wichita, KS (US); Charles Binford, Wichita, KS (US); Joseph Moore, Wichita, KS (US); Randolph Sterns, Boulder, CO (US); Jeff Stilger, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 356 days.

(21) Appl. No.: 15/142,828

(22) Filed: Apr. 29, 2016

(65) Prior Publication Data

US 2017/0316041 A1     Nov. 2, 2017

(51) Int. Cl.
    G06F 17/30      (2006.01)
    G06F 16/22      (2019.01)
    G06F 16/901     (2019.01)

(52) U.S. Cl.
    CPC ...... *G06F 16/2246* (2019.01); *G06F 16/2237* (2019.01); *G06F 16/9017* (2019.01)

(58) Field of Classification Search
    CPC ......... G06F 17/30327; G06F 17/30312; G06F 17/30321; G06F 17/30324; G06F 16/2246; G06F 16/2237; G06F 16/9017
    USPC .......................... 707/711, 736, 741, 796–801
    See application file for complete search history.

(56) References Cited

U.S. PATENT DOCUMENTS

| | | | | |
|---|---|---|---|---|
| 5,761,501 A | * | 6/1998 | Lubbers | G06F 17/30955 |
| 6,516,320 B1 | * | 2/2003 | Odom | G06F 17/30955 |
| | | | | 707/747 |
| 2003/0033328 A1 | * | 2/2003 | Cha | G06F 16/2329 |
| 2004/0024729 A1 | * | 2/2004 | Worley | G06F 12/10 |
| 2005/0171960 A1 | * | 8/2005 | Lomet | G06F 16/2246 |
| 2007/0299887 A1 | * | 12/2007 | Novik | G06F 17/30578 |
| 2011/0016153 A1 | * | 1/2011 | Atta | G06F 16/282 |
| | | | | 707/797 |

OTHER PUBLICATIONS

Pugh W., "Skip Lists: A Probabilistic Alternative to Balance Trees," Communications of the ACM, Jun. 1990, vol. 33 (6), pp. 668-676.

* cited by examiner

*Primary Examiner* — Hares Jami
(74) *Attorney, Agent, or Firm* — Haynes and Boone, LLP

(57) ABSTRACT

A method for mapping a first address space to a second address space is provided. In some embodiments, the method includes creating a first array of lookup entries and one or more second arrays of metadata entries for maintaining an ordering among the lookup entries using a tree structure. Each of the metadata entries includes one or more data index values identifying a corresponding one of the lookup entries by its position in the first array and one or more metadata index values identifying a corresponding one of the metadata entries by its position in one of the one or more second arrays. The method further includes receiving a request including a lookup value, traversing the tree structure to locate a lookup entry corresponding to the lookup value, and when the lookup value is located among the lookup entries, using the located lookup entry to process the request.

20 Claims, 22 Drawing Sheets

US 10,366,065 B2

MEMORY EFFICIENT LOOKUP STRUCTURE

TECHNICAL FIELD

The present description relates to a data storage architecture, and more specifically, to a structure and technique for a lookup structure usable as an address map used to translate memory addresses from one address space to another within the data storage architecture.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Hand-in-hand with this trend, system administrators have taken advantage of falling storage prices to add capacity wherever possible.

To provide this capacity, increasing numbers of storage elements have been added to increasingly complex storage systems. To accommodate this, the storage systems utilize one or more layers of indirection that allow connected systems to access data without concern for how it is distributed among the storage devices. The connected systems issue transactions directed to a virtual address space that appears to be a single, contiguous device regardless of how many storage devices are incorporated into the virtual address space. It is left to the storage system to translate the virtual addresses into physical addresses and provide them to the storage devices. RAID (Redundant Array of Independent/Inexpensive Disks) is one example of a technique for grouping storage devices into a virtual address space, although there are many others. In these applications and others, indirection hides the underlying complexity from the connected systems and their applications.

RAID and other indirection techniques maintain one or more tables that map or correlate virtual addresses to physical addresses or other virtual addresses. However, as the sizes of the address spaces grow, the tasks of managing and searching the tables may become a bottleneck. The overhead associated with these tasks is non-trivial, and many implementations require considerable processing resources to manage the mapping and require considerable memory to store it. Accordingly, an improved system and technique for performing lookups such as those used in mapping addresses would be desirable to dramatically improve storage system performance.

BRIEF DESCRIPTION OF THE DRAWINGS

The present disclosure is best understood from the following detailed description when read with the accompanying figures.

DETAILED DESCRIPTION

Figure 1:
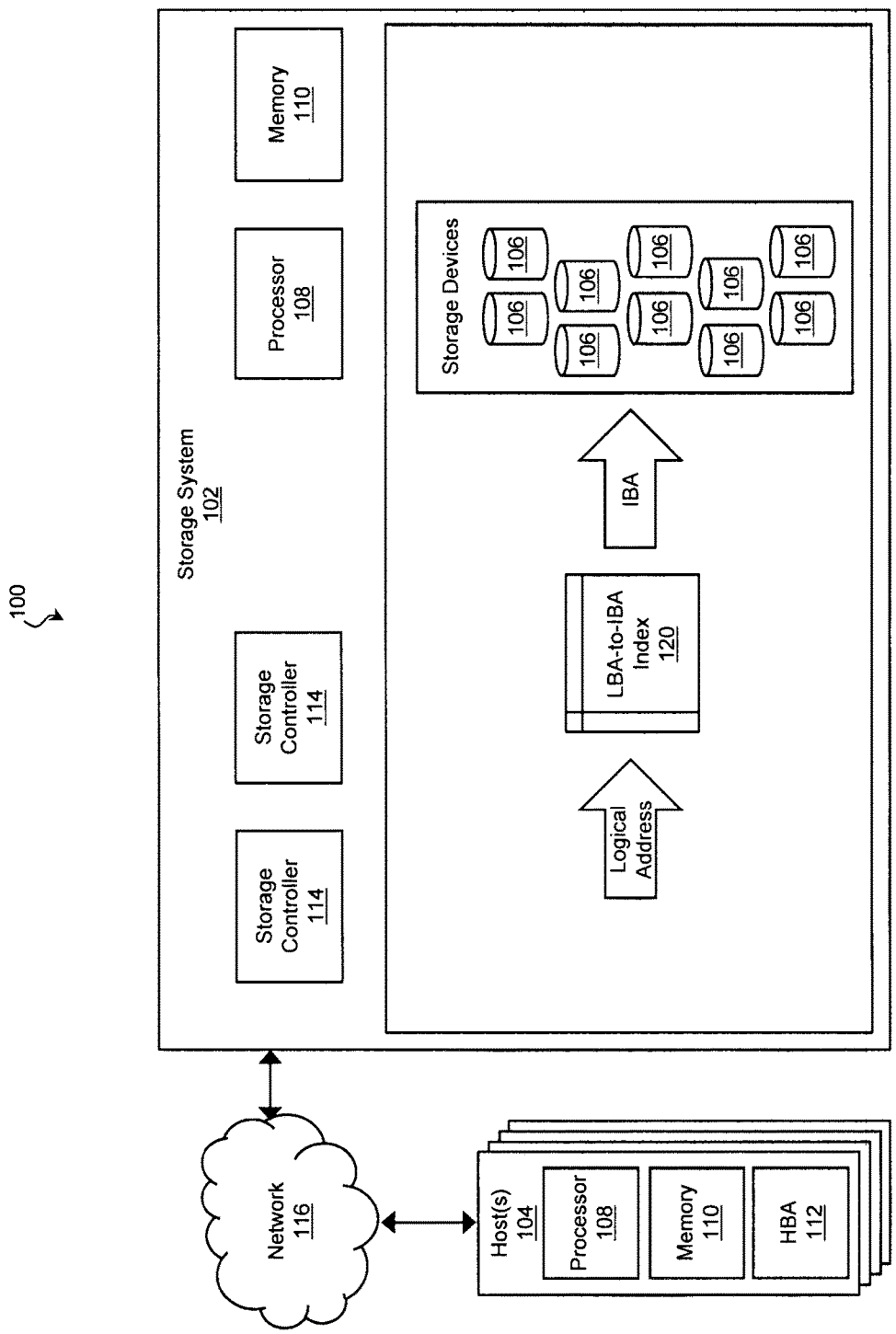
FIG. 1 is a schematic diagram of a data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments unless otherwise noted. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for mapping addresses in different address spaces and for creating and maintaining such a map. In an exemplary embodiment, a storage system maintains one or more address maps for translating addresses in a first address space into addresses in a second address space. The address maps are structured as hierarchical trees with multiple levels (L0, L1, L2, etc.). In turn, each level has its own lookup structure. In some embodiments, at least one of the levels of the address map is structured as a searchable tree to create a tree-within-a-tree architecture for the address map.

The inner tree contains a multi-level lookup structure that is efficiently organized. Any suitable tree structure, such as a binary tree, a B-tree, a red-black tree, a 2-3 tree, and/or the like may be adapted for use in the inner tree. Each of the levels in the inner tree is arranged so that the tree can be searched according to a search term (e.g., an address in a first address space) to locate a corresponding data node that matches the search term and provides, for example, information to translate the address in the first address space to an address in a second address space. The search is conducted by navigation through a hierarchy of index nodes and comparing the search term to data associated with each of the index nodes. Each of the index nodes contains a set of pointers to assist in traversing the tree. To reduce the memory footprint, the nodes are stored in arrays. Because arrays are used, the pointers in the index nodes are implemented as array indexes that identify the positions of the index or data nodes in the arrays rather than memory addresses. This can reduce the size of the pointers by a factor of four or more. Each index node uses its pointers to create one or more groups of nodes in the level below it in the inner lookup tree. In some arrangements, the number of nodes at each level in the one or more groups may be governed by a lower and/or an upper bound, and in some cases, each index node has either two or three associated nodes in the level below it. In some embodiments, separate arrays are used for the data nodes and the index nodes. This allows for more efficient copying, archiving, and merging of the information in the data nodes because the data nodes can be used without having to first separate them from the pointers in the index nodes as occurs with conventional tree implementations. In addition, the data node array can be managed as a single memory block.

This tree-within-a-tree structure provides efficient searching even with large address maps. Because pointers and other metadata that improve search performance increase the memory footprint without increasing the number of entries, the present structure effectively balances searchability with memory efficiency. In this way, the storage system is able to optimize the address maps for their unique purpose. Furthermore, because of the way entries are frequently added to the levels of the address map while deletions are rare, the present structure may emphasize efficient additions, making it well-suited to mapping addresses between address spaces. Accordingly, the present technique provides significant, meaningful, real-world improvements to lookup structures, such as those used for address mapping. The technique further provides a concrete solution to problems arising from managing large address maps. The importance of these improvements will only grow as more storage devices are added and address spaces continue to expand. Of course, these advantages are merely exemplary, and no particular advantage is required for any particular embodiment.

FIG. 1 is a schematic diagram of a data storage architecture 100 according to aspects of the present disclosure. The data storage architecture 100 includes a storage system 102 that processes data transactions on behalf of other computing systems including one or more hosts 104. The storage system 102 is only one example of a computing system that may perform data storage and indirection (i.e., virtualization). It is understood that the present technique may be performed by any computing system (e.g., a host 104 or third-party system) operable to read and/or write data from any suitable storage device 106.

The exemplary storage system 102 receives data transactions (e.g., requests to read and/or write data) from the hosts 104 and takes an action such as reading, writing, or otherwise accessing the requested data so that the storage devices 106 of the storage system 102 appear to be directly connected (local) to the hosts 104. This allows an application running on a host 104 to issue transactions directed to the storage devices 106 of the storage system 102 and thereby access data on the storage system 102 as easily as it can access data on the storage devices 106 of the host 104. It is understood that for clarity and ease of explanation, only a single storage system 102 and a single host 104 are illustrated, although the data storage architecture 100 may include any number of hosts 104 in communication with any number of storage systems 102.

Furthermore, while the storage system 102 and the hosts 104 are referred to as singular entities, a storage system 102 or host 104 may include any number of computing devices and may range from a single computing system to a system cluster of any size. Accordingly, each storage system 102 and host 104 includes at least one computing system, which in turn may include a processor 108 operable to perform various computing instructions, such as a microcontroller, a central processing unit (CPU), or any other computer processing device. The computing system may also include a memory device 110 such as random access memory (RAM); a non-transitory machine-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 112 in communication with a storage controller 114 of the storage system 102. The HBA 112 provides an interface for communicating with the storage controller 114, and in that regard, may conform to any suitable hardware and/or software protocol. In various embodiments, the HBAs 112 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. In many embodiments, the host HBAs 112 are coupled to the storage system 102 via a network 116, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. To interact with (e.g., read, write, modify, etc.) remote data, the HBA 112 of a host 104 sends one or more data transactions to the storage system 102 via the network 116. Data transactions may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

With respect to the storage system 102, the exemplary storage system 102 contains one or more storage controllers 114 that receive the transactions from the host(s) 104 and that perform the data transaction using the storage devices 106. However, a host 104 and the storage devices 106 may use different addresses to refer to the same data. For example, the host 104 may refer to a virtual address (e.g., a Logical Block Address, aka LBA) when it issues a transaction. Upon receiving the transaction, the storage system 102 may convert the virtual address into a physical address, which it provides to the storage devices 106. In other examples, the host 104 may issue data transactions directed to virtual addresses that the storage system 102 converts into other virtual addresses.

In fact, the storage system 102 may convert addresses to other types of addresses several times before determining a final address to provide to the storage devices 106. In the illustrated embodiments, the storage controllers 114 or other elements of the storage system 102 convert LBAs contained in the hosts' data transactions to a some type of internal virtual and/or physical address, referred to here as an internal block address (IBA) using one or more LBA-to-IBA indexes 120. The IBA is then provided to the storage devices 106.

While these layers of indirection may seem to create additional complexity, in many examples they actually make the address space more manageable. For example, indirection may be used to simplify data redundancy. RAID (Redundant Array of Independent/Inexpensive Disks) is one set of indirection schemes that group the storage devices 106 of a storage system for speed and/or redundancy by mapping addresses of the storage devices 106 into logical block addresses (LBAs) in a virtual address space. As another example, indirection may be used to promote sequential writing of the storage devices 106. Some storage devices 106 such as a magnetic Hard Disk Drives (HDDs) have better sequential read and write performance than random performance. Thus, indirection may be used to replace random I/O's with sequential I/O's so that data is written sequentially regardless of where the data fits into the address space. In these examples and others, the storage system 102 uses indirection to shield the hosts 104 from the complexities of the underlying storage devices 106.

Figure 2:
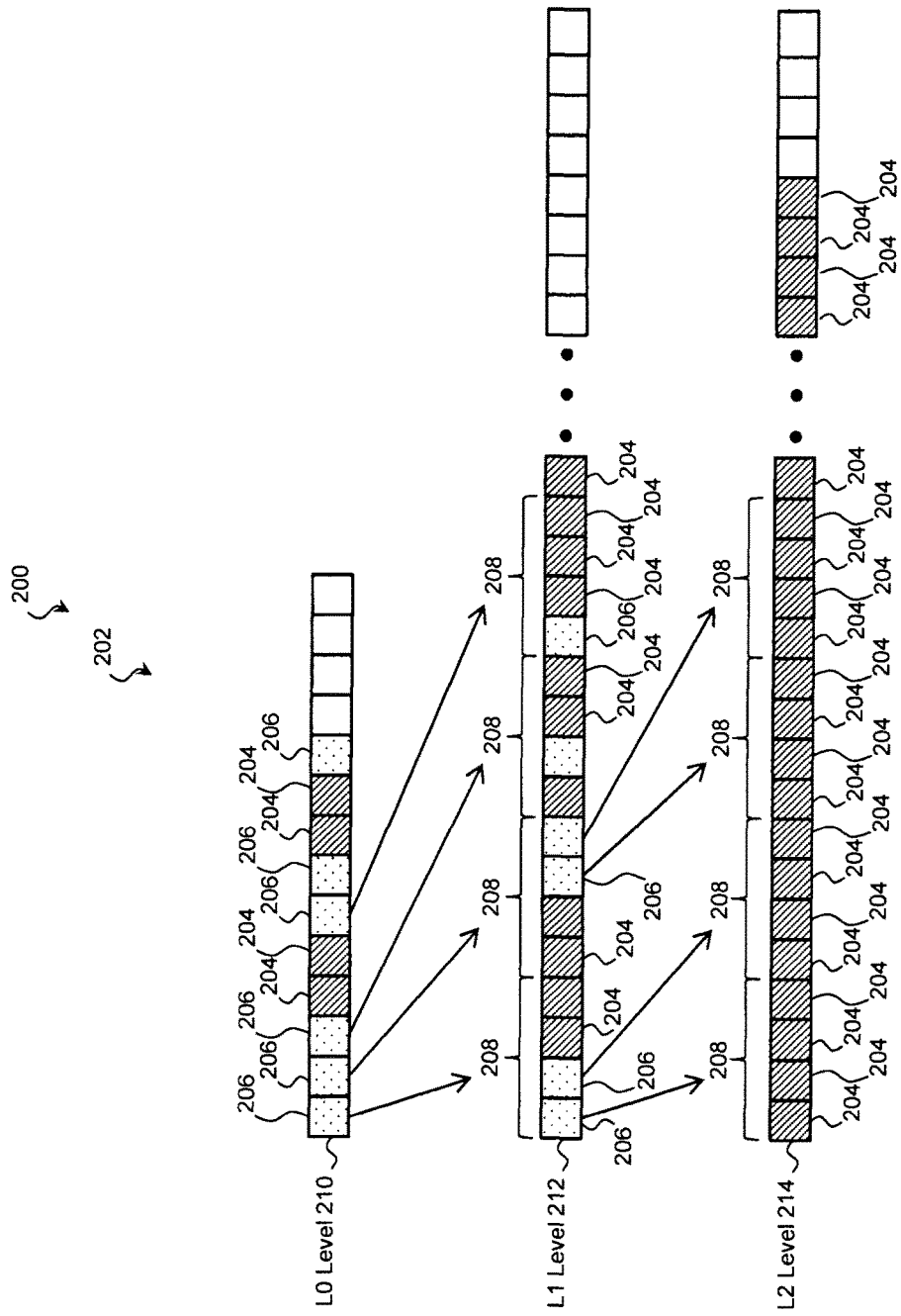
FIG. 2 is a memory diagram of an address map according to aspects of the present disclosure.

As described above, a storage controller 114 or other element of the storage system 102 utilizes an index such as an LBA-to-IBA index 120 in order to convert addresses in a first address space in to addresses in a second address space. For this purpose, each index may include one or more address maps that contain entries for use in converting addresses. FIG. 2 is a memory diagram 200 of an address map 202 according to aspects of the present disclosure. The address map 202 is suitable for use in the LBA-to-IBA index 120 and/or any other address-mapping index. Accordingly, the address map 202 may map addresses in a virtual address space (e.g., LBAs, IBAs, etc.) to addresses within another virtual or physical address space (e.g., LBAs, IBAs, virtual addresses, physical addresses, etc.).

The address map 202 includes a number of entries arranged in a memory structure, and may be maintained in any suitable structure including a linked list, a tree, a table such as a hash table, an associative array, a state table, a flat file, a relational database, and/or other memory structure. One particular data structure that is well-suited for use as an address map 202 is a hierarchical tree. A hierarchical tree contains leaf nodes that map addresses and index nodes that point to other nodes. These nodes are arranged in hierarchical levels structured for searching.

In the illustrated embodiments, the leaf nodes are data range descriptors 204 that each map an address or address range in a first address space to an address or address range in a second address space. The data range descriptors 204 may take any suitable form, examples of which are described below.

The other types of nodes, index nodes 206 may be found in any of the upper levels of the hierarchical tree and refer to the next lower level. To that end, each index node 206 may map an address or address range in the first address space to a corresponding index page 208, a region of the next lower level of any arbitrary size and that contains any arbitrary number of index nodes 206 and/or data range descriptors 204.

In the illustrated embodiments, the address map 202 is a three-level hierarchical tree although it is understood that the address map 202 may have any suitable number of levels of hierarchy. The first exemplary level, referred to as the L0 level 210, has the highest priority in that it is searched first and data range descriptors 204 in the L0 level 210 supersede data in other levels. It is noted that when data range descriptors 204 are added or modified, it is not necessary to immediately delete an old or existing data range descriptor 204. Instead, data range descriptors 204 in a particular level of the hierarchy supersede those in any lower levels while being superseded by those in any higher levels of the hierarchy.

The second exemplary level, the L1 level 212, is an intermediate hierarchical level in that it is neither the first level nor the last. Although only one intermediate hierarchical level is shown, in various embodiments, the address map 202 includes any numbers of intermediate levels. As with the L0 level 210, intermediate level(s) may contain any combination of data range descriptors 204 and index nodes 206. Data range descriptors 204 in an intermediate level supersede those in lower levels (e.g., the L2 level 214) while being superseded by those in upper levels of the hierarchy (e.g., the L0 level 210).

The L2 level 214 is the third illustrated level, and is representative of a lowest hierarchical level. Because the L2 level 214 does not have a next lower level for the index nodes 206 to refer to, it includes only data range descriptors 204. In a typical example, the L2 level 214 has sufficient capacity to store enough data range descriptors 204 to map each address in the first address space to a corresponding address in the second address space. However, because some addresses in the first address space may not have been accessed yet, at times, the L2 level 214 may contain significantly fewer data range descriptors 204 than its capacity.

In order to search the address map 202 to translate an address in the first address space, the storage controller 114 or other computing entity traverses the tree through the index nodes 206 until a data range descriptor 204 is identified that corresponds to the address in the first address space. To improve search performance, the data range descriptors 204 and the index nodes 206 may be sorted according to their corresponding addresses in the first address space. This type of hierarchical tree provides good search performance without onerous penalties for adding or removing entries.

Figure 3:
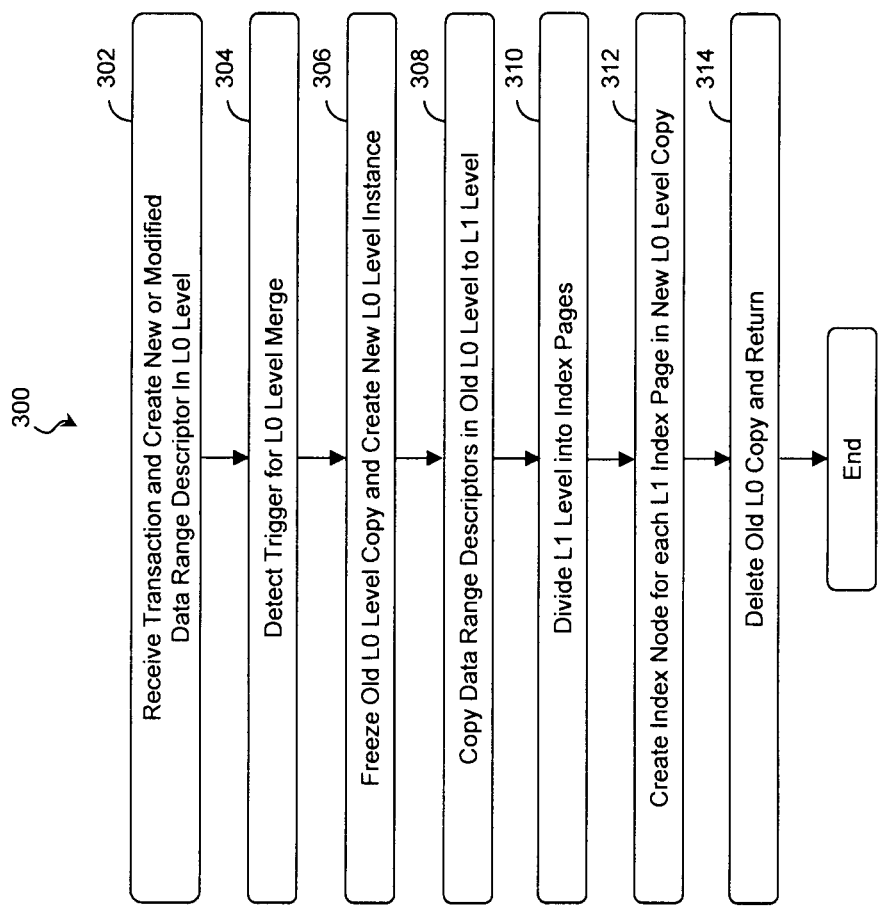
FIG. 3 is a flow diagram of a method of managing the address map according to aspects of the present disclosure.

A technique for managing such an address map 202 is described with reference to FIGS. 3-7. In that regard, FIG. 3 is a flow diagram of a method 300 of managing the address map 202 according to aspects of the present disclosure. It is understood that additional steps can be provided before, during, and after the steps of method 300, and that some of the steps described can be replaced or eliminated for other embodiments of the method. FIGS. 4-7 are memory diagrams 400 of an address map 202 at various stages of the method 300 according to aspects of the present disclosure.

Figure 4:
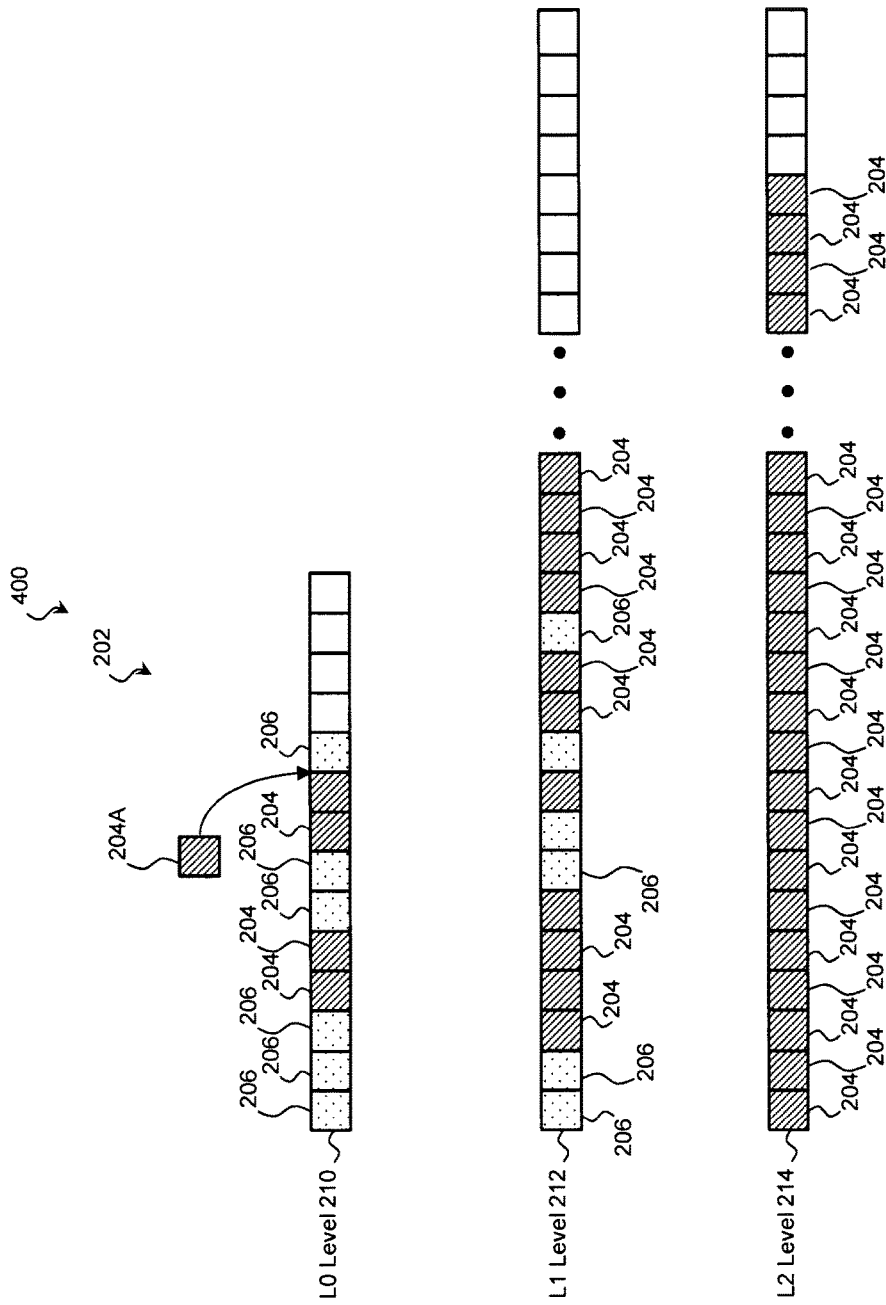
FIGS. 4-7 are memory diagrams of an address map at various stages of the method according to aspects of the present disclosure.

Referring to block 302 of FIG. 3 and to FIG. 4, when a transaction is received that creates or modifies a data range descriptor 204, the storage controller 114 or other computing element writes a new data range descriptor 204A to the L0 level 210. As the index nodes 206 and data range descriptors 204 in the L0 level 210 may be sorted according to their respective addresses in the first address space, the new data range descriptor 204A may be inserted at a location selected to preserve this ordering of nodes. It is noted that writing a data range descriptor 204 to the L0 level 210 may supersede a data range descriptor in the L1 level 212 or in the L2 level 214. The process of block 302 may be repeated multiple times.

Referring to block 304 of FIG. 3, the storage controller 114 or other computing element detects a trigger that initiates a merge process on the L0 level 210. In that regard, any suitable trigger may be used. In many examples, the trigger is based at least in part on the percentage of the L0 level 210 that is used. Additionally or in the alternative, the trigger may be based at least in part on: a percentage of another level that is used, an interval of time, a total count of data transactions received or processed, a system event such as a change in the storage devices 106, and/or any other suitable triggering event.

Figure 5:
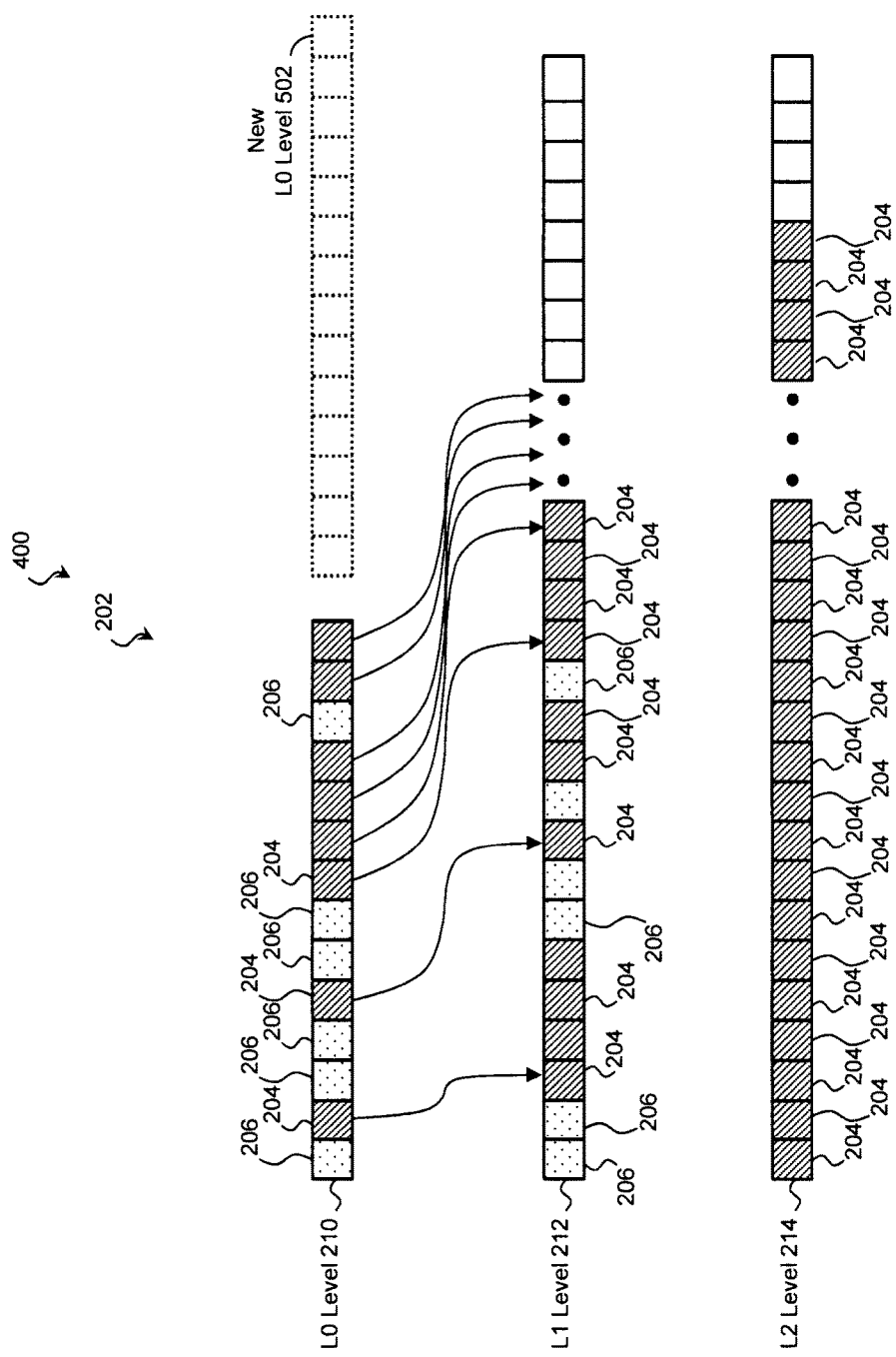
Figure 6:
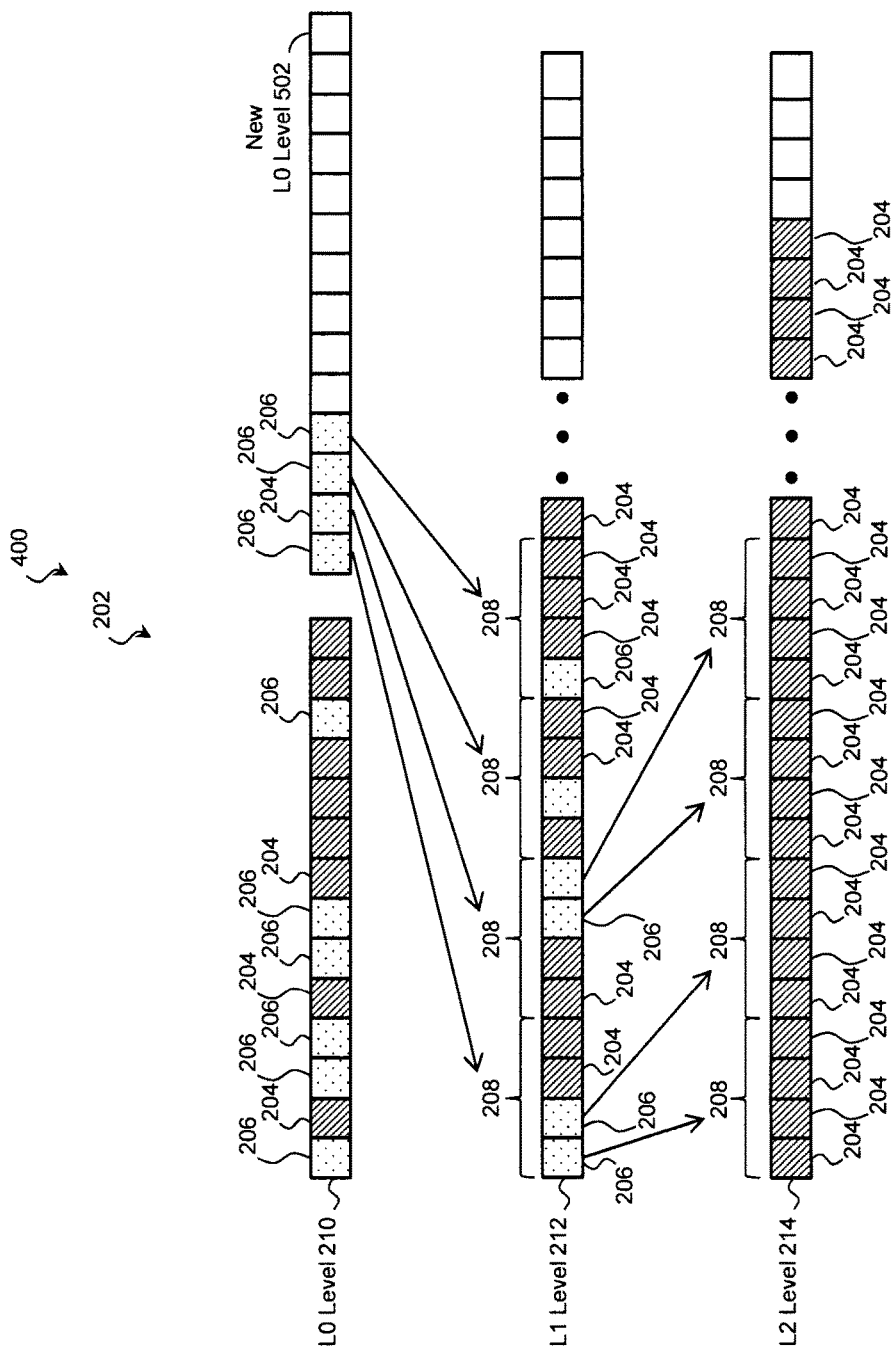
Figure 7:
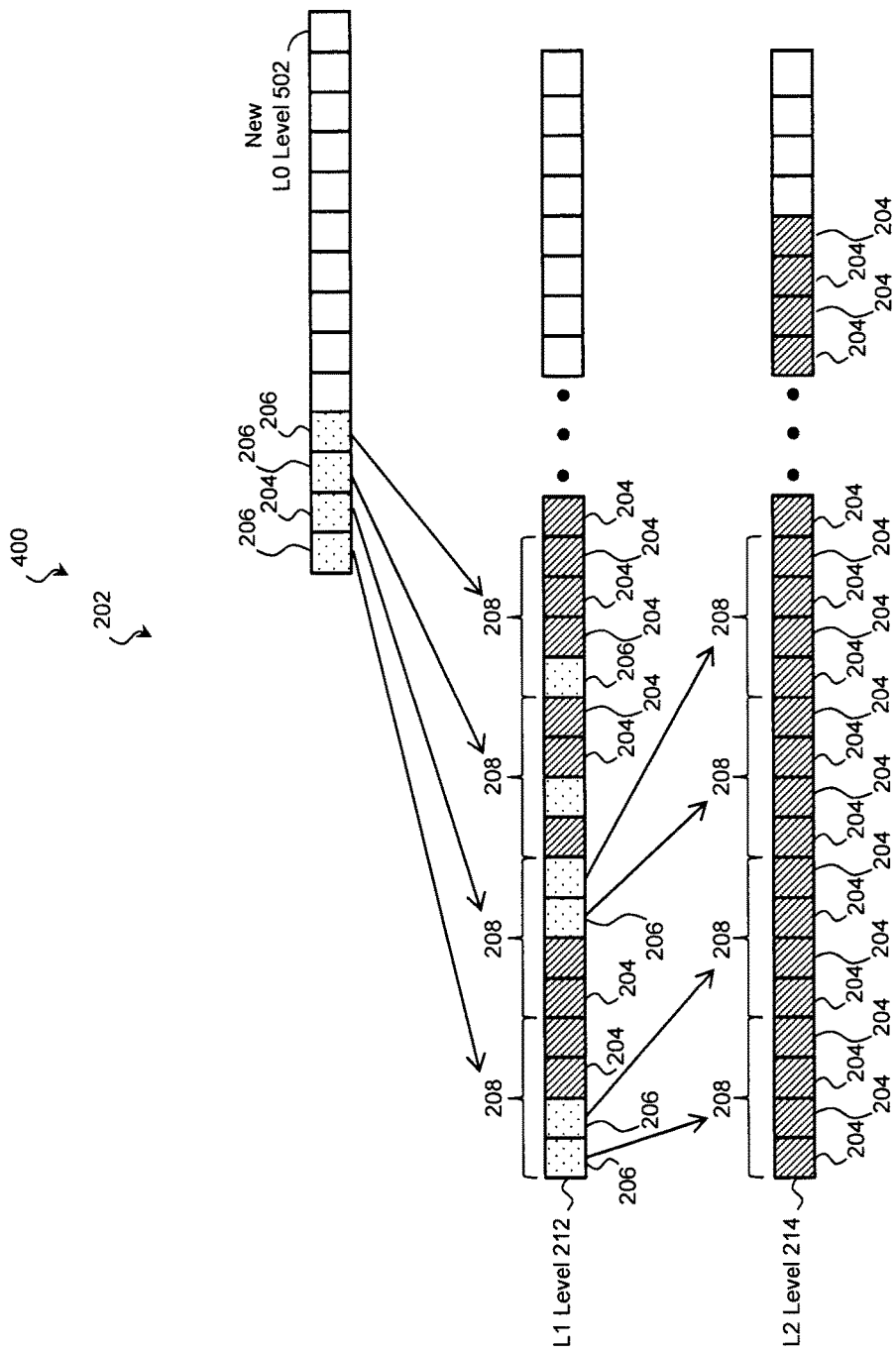

Referring to block 306 of FIG. 3 and to FIG. 5, upon detecting a trigger, the storage controller 114 or other computing element initiates the merge process by freezing the existing L0 level 210 and creating a placeholder in memory for a new instance 502 of the L0 level. Referring to block 308 of FIG. 3, the storage controller 114 or other computing element copies the data range descriptors 204 in the existing L0 level 210 into the next lowest level (the L1 level 212). The copied data range descriptors 204 may overwrite superseded data range descriptors 204 already in the L1 level 212. In so doing, this process "frees" the capacity of the address map 202 trapped in the superseded data range descriptors 204.

Referring to block 310 of FIG. 3, the storage controller 114 or other computing element divides the next lowest level (the L1 level 212) into index pages 208. In some embodiments, the storage controller 114 merely retains the existing index pages 208 already defined in the lower level. Referring to block 312 of FIG. 3 and to FIG. 6, the storage controller 114 or other computing element creates an index node 206 for each index page 208 in the next lowest level and writes them into the new instance 502 of the L0 level. Referring to block 314 of FIG. 3 and to FIG. 7, the storage controller 114 or other computing element completes the merge process by deleting the old L0 level 210 and returning to block 302. When new data range descriptors 204 are written in block 302, they are written to the new instance 502 of the L0 level.

It will be recognized that the merge process of blocks 306 through 314 may also be performed on any of the intermediate hierarchical levels, such as the L1 level 212, to compact the levels and free additional trapped capacity.

As noted above, the address maps 202 may be implemented using any suitable data structure. There are a number of properties characteristic of indexes such as the LBA-to-IBA indexes 120 that may make certain data structures more useful than others. For example, the address maps 202 of the indexes may contain a large number of nodes. Levels of any given address map may contain 64K or more nodes (including both data range descriptors 204 and index nodes 206). Because of the frequency with which the address maps 202 are searched, they may be structured to provide optimal search performance despite the large number of nodes.

Another property common to address maps 202 is that they may experience more node additions than deletions. For example, new nodes may be added to an L0 level 210 as data transactions are received, which is a frequent occurrence, while nodes may be deleted significantly less often. In fact, in some such examples, nodes are only deleted during a merge when the old L0 level 210 is deleted in block 314. Accordingly, a suitable data structure for any level (L0, L1, L2, etc.) of the address map 202 may be selected to provide good search performance even with a large number of nodes and to emphasize adding nodes over deleting nodes.

Accordingly, data structures that provide good search speeds (e.g., O(log(N)) search speeds for data structures with N entries stored in them) are generally preferred. Additionally, data structures that also support fast insertions (e.g., O(log(N))) that maintain a sorting order of the data structure are preferred as well. A commonly used class of data structures that provide both good search and good insertion characteristics are tree structures, such as binary trees, B-trees, red-black trees, 2-3 trees, and/or the like. An example of a possible binary tree structure 2000 is shown with reference to FIG. 8.

Figure 8:
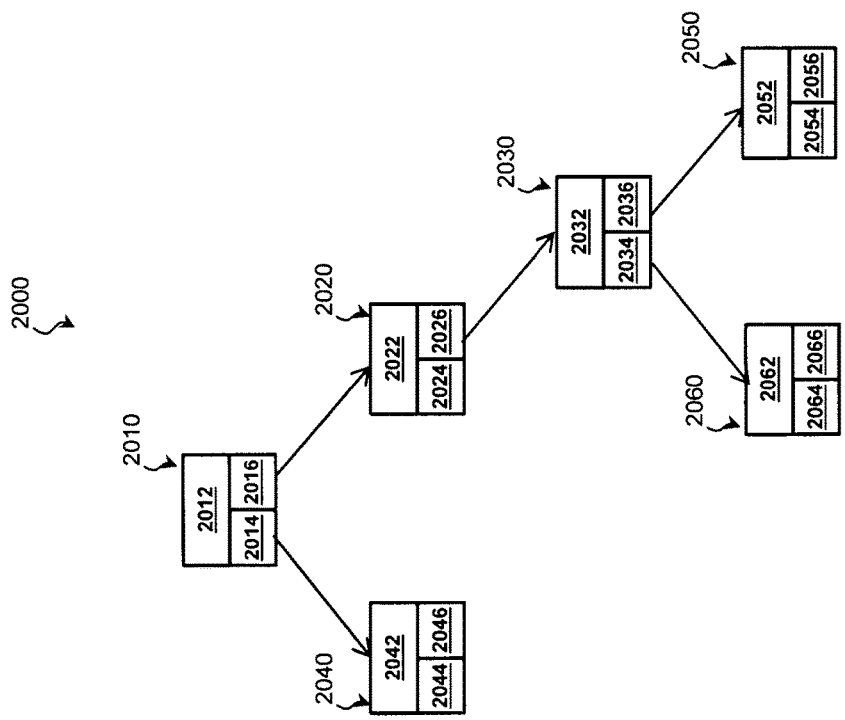
FIG. 8 is a binary tree data structure for use in a level of an address map according to aspects of the present disclosure.

As shown in FIG. 8, binary tree 2000 includes six nodes 2010-2060 corresponding to six entries from a look-up structure, such as one of the levels of address map 202. One of ordinary skill, however, would understand that in practice binary tree 2000 and other look up structures may contain fewer than six and/or many more than six entries. For the sake of illustration only, it is assumed that the six entries in binary tree data structure 2000 were created in numerical order (i.e., node 2010 was created first, followed by nodes 2020-2050 in chronological order) based on corresponding operations involving the look up structure. Node 2010 is at the head of binary tree 2000 and demonstrates the data and metadata used to maintain binary tree 2000. More specifically, node 2010 includes data 2012 for storing the data associated with node 2010, such as a data range descriptor 204 and/or an index node 206. Node 2010 further includes a left pointer 2014 that points to a node at a head of a first sub-tree below node 2010 and a right pointer 2016 that points to a node at a head of a second sub-tree below node 2010. As shown, left pointer 2014 points to node 2040 and right pointer 2016 points to node 2020. When binary tree 2000 is organized so as to order the data in the nodes in ascending left-to-right order, such as by the LBAs in a first address space that is to be translated to an IBA in a second address space, the data in each of the nodes in the first sub-tree have lesser values than the data 2012 in node 2010 and the data in each of the nodes in the second sub-tree have greater values than the data 2012 in node 2010. Thus, as depicted, the data in nodes 2010-2060 in ascending order are data 2042, data 2012, data 2022, data 2062, data 2032, and data 2052. When one of the right or left pointers does not point to a sub-tree, a value of NULL or other such value may be used. Thus, as depicted, pointers 2024, 2044, 2054, 2056, 2064, and 2066 have values of NULL or another such value. As is well known, data structures like binary tree 2000 have, except in pathological cases, search and insertion costs of O(log(N)). Other tree structures, such as B-trees, red-black trees, 2-3 trees, and/or the like also have search and insertion costs of O(log(N)) and may have better balance and/or rebalancing costs than a binary tree.

However, traditional tree structures involving nodes and pointers are generally not ideal for lookup structures having properties similar to those found in the levels (L0, L1, L2, etc.) and especially level L0 of address map 202. For example, binary tree 2000 relies on nodes containing both data and the metadata (e.g., the left and right pointers) used to maintain the tree structure. This means that the copy and merge operations, such as those used during process 308 have to separate the data of the data range descriptors 204 and/or the index nodes 206 from the right and left pointers as they are no longer correct when the data range descriptors 204 and/or the index nodes 206 are moved to a next lower level in the address map. In addition, the left and right pointers are typically implemented as memory addresses as they each correspond to the memory address of the node at a head of a sub-tree. For devices with large memory spaces, each of these left and right pointers may have to store addresses of 64 bits or more in length. This may not be particularly efficient in situations where the number of entries in a level of an address map is typically much smaller than the full range of possible address maps. For example, each of the N entries in a level can be uniquely identified using only n=log2(N) bits; so that when the number of entries is kept to 255 or less, each entry can be uniquely identified using 8 bits and when the number of entries is kept to 64K or less, each entry can be uniquely identified using 16 bits.

To take advantage of the smaller numbers of entries in a level, the node and pointer structure of data structure 2000 can be replaced with a structure, such as an array, which can be accessed via indexes that are smaller than pointers. In addition, indexes may also be used to separate the data from the metadata by placing the data and metadata into different arrays. One additional advantage of the use of arrays in data structure 2100 over the nodes and pointers of data structure 2000 is that the data (e.g., the data range descriptors 204 and/or the index nodes 206) are kept in a consecutive block of memory (the data array) making copying and archiving of the data much simpler than having to traverse the pointers of a tree structure to find them one at a time.

Figure 9:
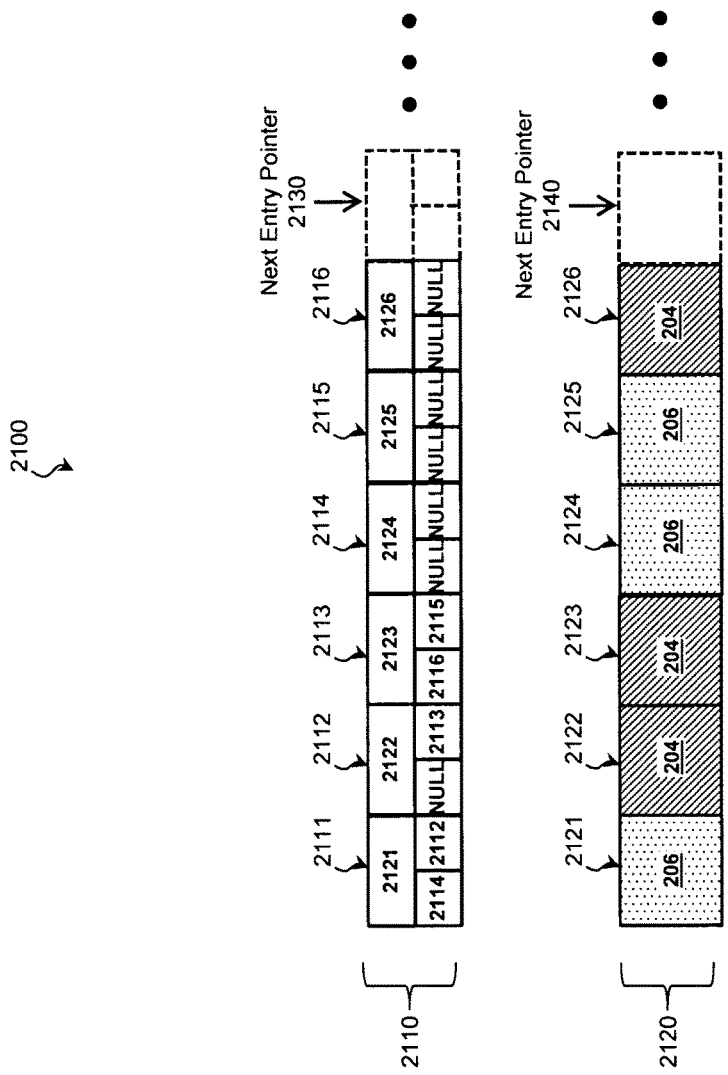
FIG. 9 is a memory diagram of the binary tree data structure of FIG. 8 according to aspects of the present disclosure.

An example of a possible binary tree structure 2100 using arrays and indexes is shown with reference to FIG. 9. As is shown in FIG. 9, binary tree structure 2100 is organized around two arrays 2110 and 2120. Array 2110 is an array of nodes used to store the metadata used to manage the structure of binary tree structure 2100. Array 2120 is an array of nodes used to store the data of the binary tree structure 2100, such as the data range descriptors 204 and/or the index nodes 206. FIG. 9 also shows binary tree structure 2100 storing a binary tree with the same structure as binary tree 2000 of FIG. 8. Like binary tree 2000, the nodes of binary tree structure 2100 are created in the same order. Thus, because binary tree structure 2100 uses arrays, the nodes for the metadata array 2110 are allocated in the order 2111, 2112, . . . 2116 and the nodes for the data array 2120 are allocated in the order 2121, 2122, . . . 2126. Thus, data node 2121 and metadata node 2111 correspond to node 2010, data node 2122 and metadata node 2112 correspond to node 2020, etc. Accordingly, the relationships between the nodes of binary tree structure 2100 are the same as the nodes of binary tree 2000. For example, the left index value of metadata node 2111 points to node 2114 (i.e., identifies a position of node 2114 in array 2110) and the right index value of metadata node points to node 2112 (i.e., identifies a position of node 2114 in array 2110). Similarly, the left index value of node 2112 is NULL indicating there is no left sub-tree to node 2112 (corresponding to node 2020) and the right index value of node 2112 points to node 2113 (corresponding to node 2030). Examination of each of the other nodes 2113-2116 shows left and right index values consistent with the structure of binary tree 2000. Each of the metadata nodes 2111-2116 also include a data index value pointing to an entry in data array 2120 (i.e., identifies a position of a data node in array 2120), which corresponds to the data in those respective nodes. To keep track of how much of the metadata array 2110 and the data array 2120 are in use (i.e., a number of entries in them), next entry pointers 2130 and 2140 are maintained. One additional observation for binary tree structure 2100 is that because each of the nodes is usable to store only one data element (e.g., one data range descriptor 204 or one index node 206), if the metadata array 2110 and the data array 2120 are kept in alignment, the data index values in each of the metadata nodes and the next entry pointer 2140 may be eliminated because the index value identifying the metadata for the node in metadata array 2110 and the index value identifying the data for the node in the data array 2120 are the same. Elimination of these redundant indexes results in even greater memory efficiency. This additional efficiency, however, would not apply to tree structures storing multiple data values per node, such as for B-trees, 2-3 trees, and/or the like.

Thus, by taking advantage of the knowledge that some address map levels have a limited size and are suitable for use with an array and index based approach, the storage overhead to implement an address translation or other lookup structure can be significantly reduced as shown by the examples of FIGS. 8 and 9. In addition, the separation of the data from the metadata into separate arrays provides additional advantages when the data is copied, merged, and/or archived.

Figure 10:
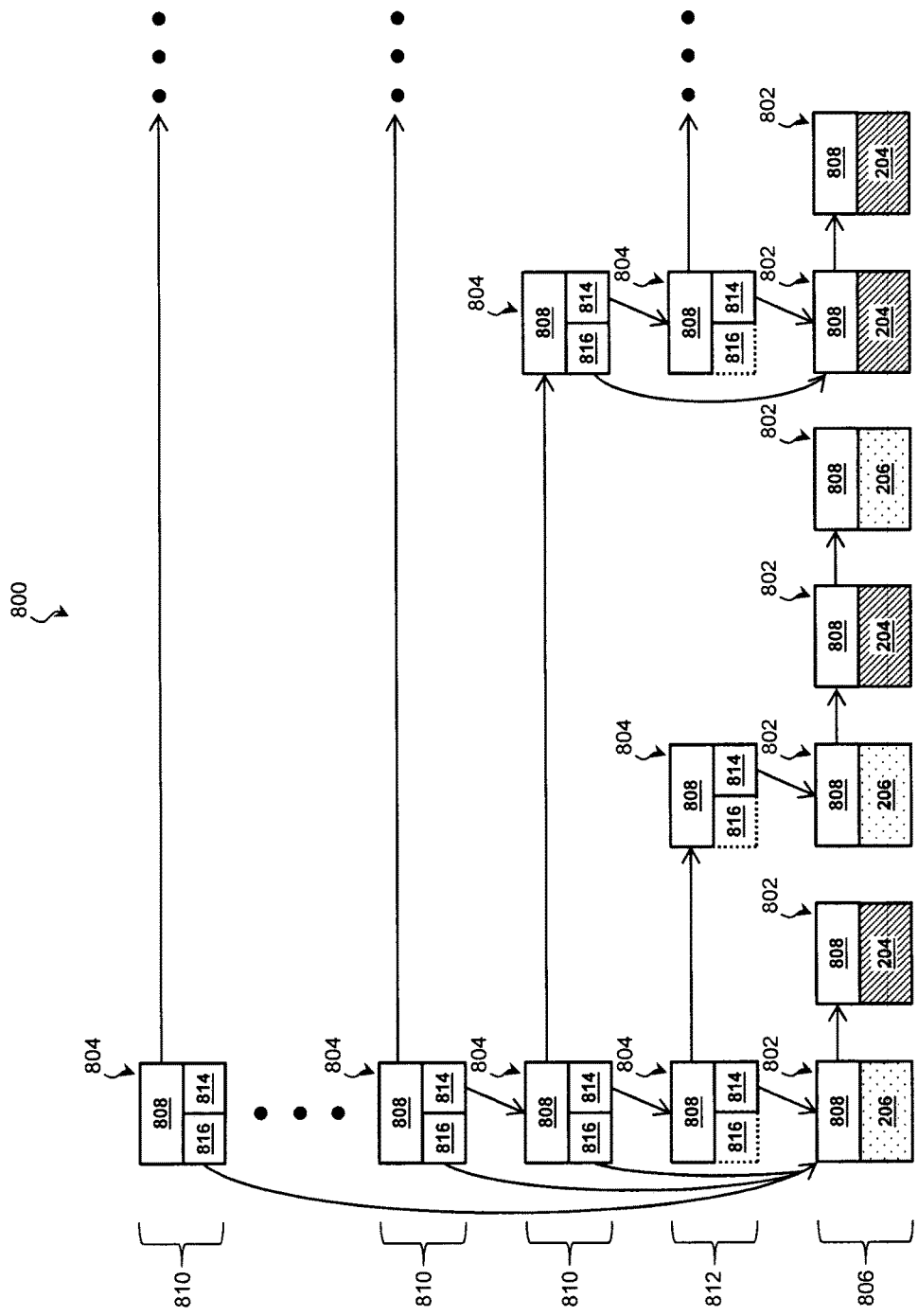
FIG. 10 is a memory diagram of a data structure for a level of an address map according to aspects of the present disclosure.

Using the principles as discussed above with respect to FIGS. 8 and 9, a suitable exemplary data structure is described with reference to FIG. 10. In that regard, FIG. 10 is a memory diagram of a data structure 800 for a level of an address map 202 according to aspects of the present disclosure. The data structure 800 is suitable for use as any level (e.g., L0 level 210, L1 level 212, L2 level 214, etc.) of an index for mapping addresses in a first address space to addresses in a second address space such as the aforementioned LBA-to-IBA index 120.

As shown in FIG. 10, the exemplary data structure 800 may be structured as a hierarchical search tree and when it is used to implement a level of an address map 202 that is also a hierarchical tree, the data structure 800 may be described as a tree-within-a-tree. In that regard, the data structure 800 may include leaf nodes 802 that contain data and index nodes that point to other nodes within the data structure 800. For clarity, these index nodes may be referred to as intra-level index nodes 804 to distinguish them from the index nodes 206 that point to nodes in other levels of the address map 202. The latter index nodes 206 (along with the data range descriptors 204) are actually part of the leaf nodes 802 for the purposes of this data structure 800.

All of the leaf nodes 802 are arranged at a single, lowest level of the data structure 800, the leaf level 806. The leaf nodes 802 are ordered in the leaf level 806 according to the respective addresses in the first address space (e.g., LBA, IBA, variants thereof, etc.) that each of the leaf nodes 802 is being used to provide an address translation for. The leaf nodes 802 may include a next sibling pointer 808 that points to the leaf node 802 that is next in the search order. As described in more detail below, because the leaf nodes 802 are grouped, the next sibling pointer 808 of some leaf nodes 802 may be set to NULL or another such value indicating the end of the group rather than pointing to the leaf node 802 that is next in the sort order.

Above the leaf level 806 are any number of index levels 810 (including leaf parent index level 812) that contain intra-level index nodes 804. Similar to the leaf nodes 802, within each index level 810, the intra-level index nodes 804 are sorted according to their respective addresses in the first address space. Each intra-level index node 804 is associated with a group of nodes within the level immediately below it. The nodes in the group may be referred to as child nodes of the intra-level index node 804. Each intra-level index node 804 may have any number of child nodes (either intra-level index nodes 804 or leaf nodes 802) associated with it. However, in some embodiments, the number of possible children has a lower and/or upper bound. For example, in one such embodiment, the number is bounded between 2 and 3, and each intra-level index node 804 has either 2 or 3 child nodes associated with it. In another such embodiment, each intra-level index node 804 has 2, 3, or 4 child nodes. While these embodiments encompass any upper and lower bounds, the lower bound may be selected to be greater than 1 to prevent degenerate intra-level index nodes 804.

As an alternative to keeping a list of all associated child nodes within the intra-level index node 804, each intra-level index node 804 may include a child pointer 814 that points to whichever child node in the group associated with the intra-level index node 804 is first according to the search order. The group can then be traced using the next sibling pointers 808 of the child nodes, and for that purpose, each child node has a next sibling pointer 808 that points to the next child node (according to the search order) except for the last child node in the group. For this last child node, the next sibling pointer 808 may be set to NULL or another such value indicating the end of the group. This applies to all types of child nodes, and thus, the intra-level index nodes 804 may include next sibling pointers 808 similar to those of the leaf nodes 802.

Additionally, each intra-level index node 804 may include a minimum leaf pointer 816 that points to whichever leaf node 802 associated with the intra-level index node 804 is first in the search order. The difference between the minimum leaf pointer 816 and the child pointer 814 is that the child pointer 814 points to the first child node in the level immediately below the intra-level index node 804, while the minimum leaf pointer 816 points to the first leaf node regardless of how many intervening levels of hierarchy are in between. For the index level 810 immediately above the leaf level 806 (i.e., the leaf parent index level 812), the minimum leaf pointer 816 has the same value as the child pointer 814. Thus, the intra-level index nodes 804 in the leaf parent index level 812 may omit the minimum leaf pointer 816.

Figure 11:
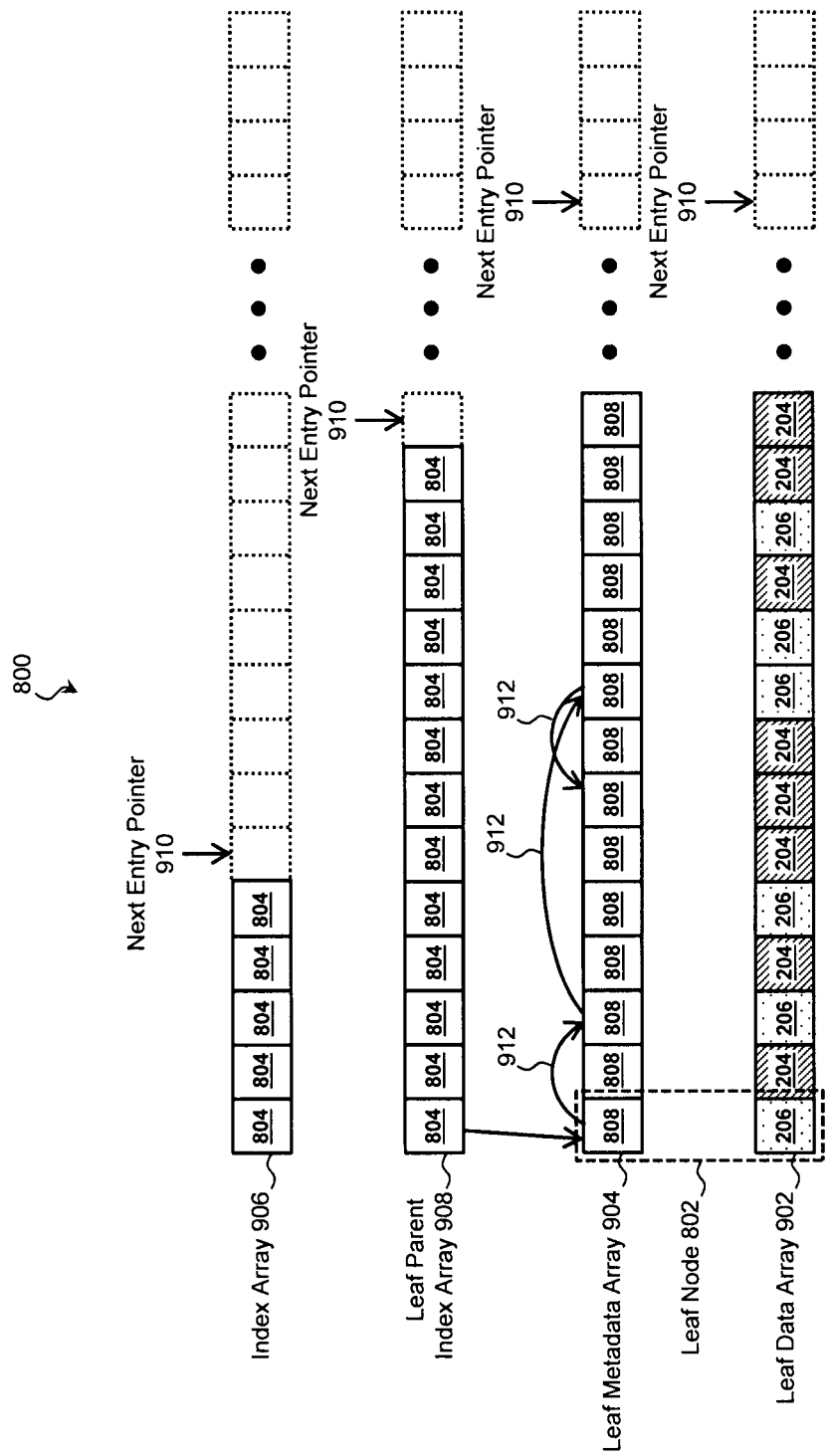
FIG. 11 is a memory diagram of the data structure of FIG. 10 according to aspects of the present disclosure.

While the illustration of FIG. 10 shows the nodes of the data structure 800 arranged in search order, it is not required to maintain the nodes in this order in memory because the pointers may be used to maintain the search order regardless of how the nodes are actually arranged in memory. Accordingly, a suitable technique for storing the nodes of the data structure 800 is described with reference to FIG. 11. In that regard, FIG. 11 is a memory diagram of the data structure 800 as arranged in a memory device according to aspects of the present disclosure. As described above, the data structure 800 is suitable for use as any level (e.g., an L0 level, an L1 level, an L2 level, etc.) of an index for mapping addresses in a first address space to addresses in a second address space such as the aforementioned LBA-to-IBA index 120.

The data structure 800 includes several arrays stored in a pool of memory. The pool of memory may represent any suitable storage devices such as nonvolatile RAM (e.g., battery-backed DRAM), solid state storage (e.g., SSDs), etc. Because the leaf nodes 802 and the intra-level index nodes 804 to be stored in the arrays have a known relationship, a maximum size can be selected for each array based on the maximum number of leaf nodes 802 to be stored and the worst-case number of intra-level index nodes 804. In the worst-case, each intra-level index node 804 will have the minimum number of child nodes permitted by the lower bound. Thus, for a desired number of leaf nodes 802, a worst-case number of intra-level index nodes 804 and a total memory footprint can be determined. Alternately, the maximum number of leaf nodes 802 that can be supported by a given amount of memory can be determined by working backwards from the size of the pool of available memory.

Thus, in these examples and others, the arrays are sized based on a desired number of leaf nodes 802, an amount of available memory, and/or any other suitable factor.

These arrays include one or more arrays for the leaf nodes 802. In some examples, a single array stores all the data associated with the leaf nodes 802. However, in the illustrated embodiments, the data of the leaf nodes 802 is separated from the metadata. A leaf data array 902 stores the data range descriptors 204 and index nodes 206 that are part of the leaf nodes 802, while a leaf metadata array 904 stores the metadata (e.g., the next sibling pointer 808) associated with the data range descriptors 204 and index nodes 206. Rather than include a pointer linking each metadata element to the respective data element, data and metadata may share the same index number within their respective arrays. Thus, metadata at any arbitrary index within the leaf metadata array 904 is associated with the data range descriptor 204 or index node 206 at the same index.

As described above, the leaf data array 902 and leaf metadata array 904 may maintain their respective data and metadata in any order, and in some embodiments, each new entry is added in the next unused location in the array. So that data and metadata can be added to the array(s) sequentially and independent of the search order, the next sibling pointers 808 associated with each entry in the leaf metadata array 904 maintain the search order. Arrows 912 represent a set of next sibling pointers 808 tracing the search order through an exemplary group of leaf nodes 802.

In addition to the leaf node arrays, the data structure 800 includes an index array 906 (including leaf parent index array 908) that store intra-level index nodes 804. As noted above, some of the intra-level index nodes 804 may have different numbers of pointers. Accordingly, in the illustrated embodiment, index array 906 is configured to store intra-level index nodes 804 that contain a child pointer 814, a next sibling pointer 808, and a minimum leaf pointer 816, while the leaf parent index array 908 is configured to store intra-level index nodes 804 that contain a child pointer 814 and a next sibling pointer 808.

One advantage to storing the intra-level index nodes 804 and the leaf nodes 802 in arrays is that it may simplify and reduce the bit length of the pointers (e.g., child pointer 814, next sibling pointer 808, minimum leaf pointer 816, etc.). This is because instead of storing a full memory address of a target node, as in a conventional memory pointer, the pointers may store an array index of the target node. The array index may take up fewer bits than a memory address, and the size of the nodes may be reduced. In one example with 64K nodes, each pointer stores a 16-bit array index instead of a 64-bit pointer to a memory address.

To facilitate adding new nodes, each leaf data array 902, leaf metadata array 904, index array 906, and/or leaf parent index array 908 may have an associated next entry pointer 910 that records the first unused location in the respective array.

Figure 12A:
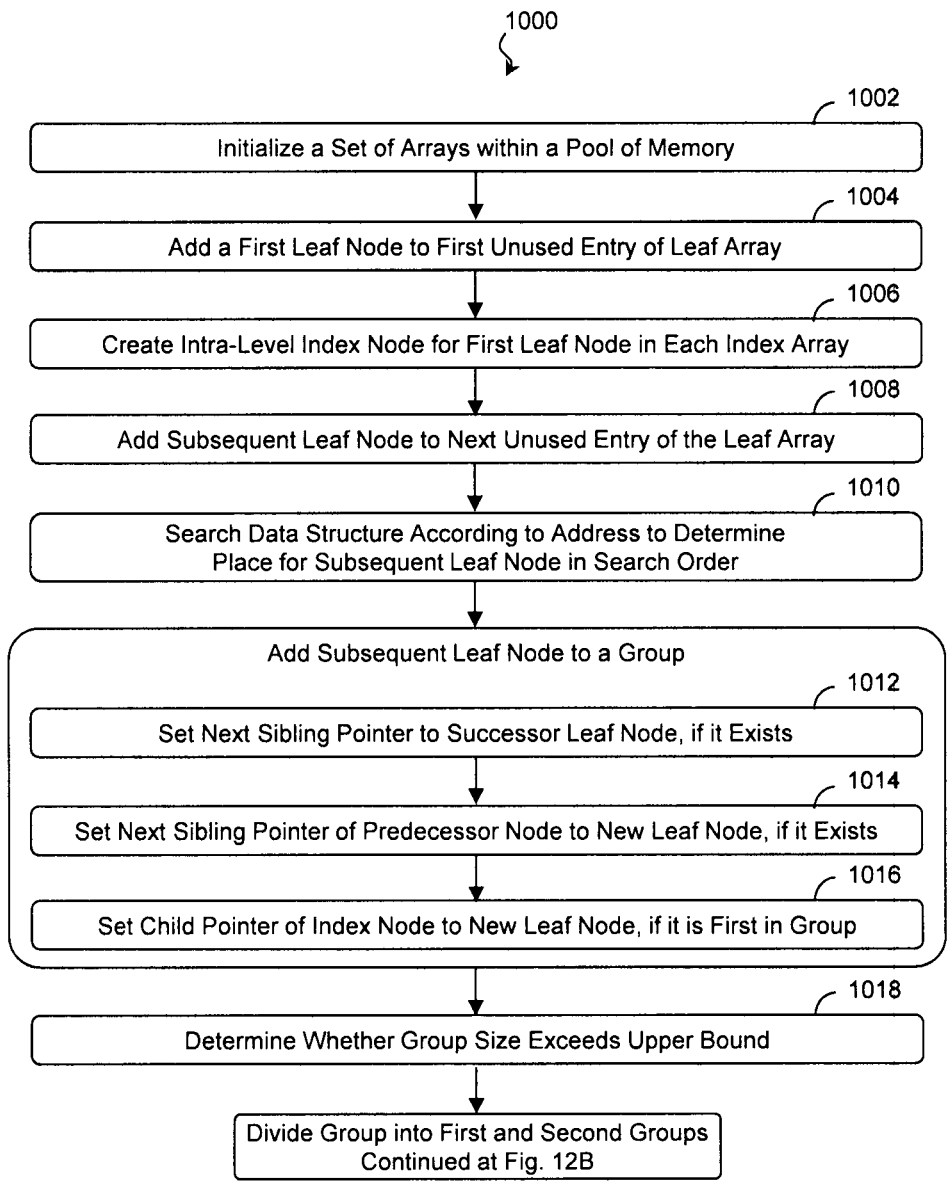
FIGS. 12A and 12B are flow diagrams of a method for creating and maintaining a data structure for a level of an address map according to aspects of the present disclosure.
Figure 12B:
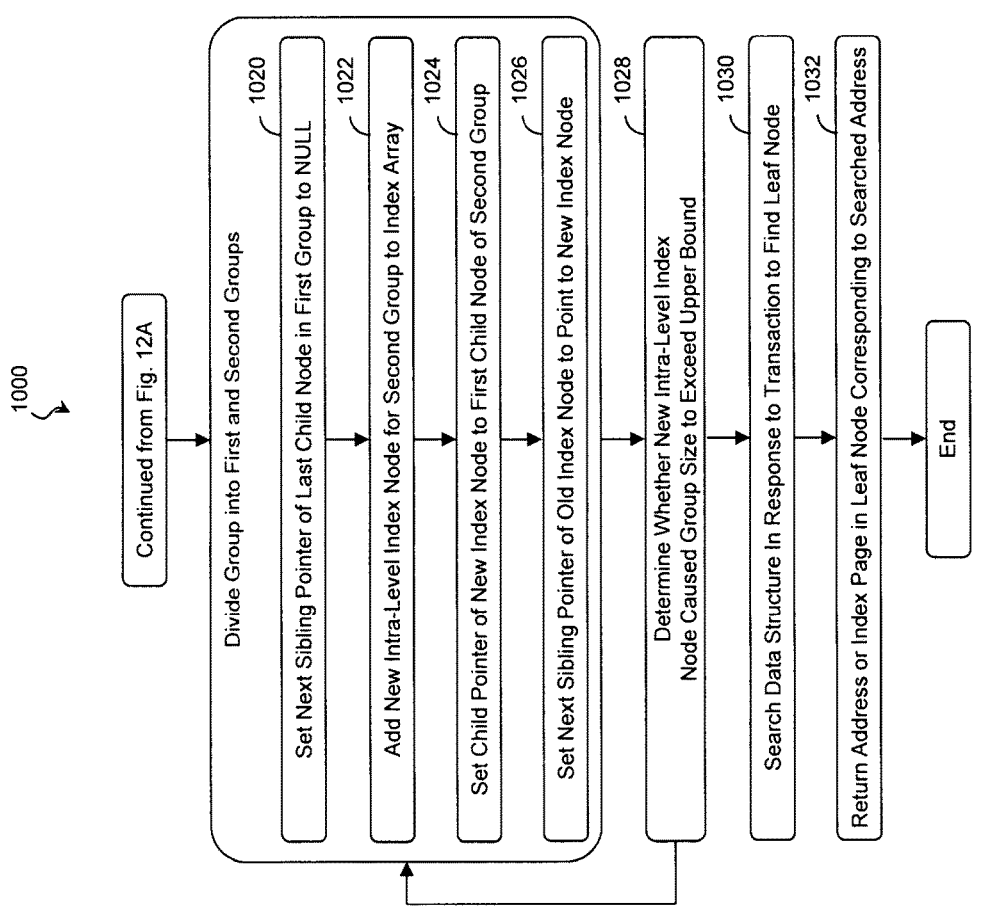

A technique for creating the data structure 800 and for maintaining it as transactions are received is described with reference to FIGS. 12A, 12B, and 13-18. FIGS. 12A and 12B are flow diagrams of a method 1000 for creating and maintaining a data structure for a level of an address map 202 according to aspects of the present disclosure. It is understood that additional steps can be provided before, during, and after the steps of method 1000, and that some of the steps described can be replaced or eliminated for other embodiments of the method. FIGS. 13-18 are memory diagrams of the data structure 800 at various stages of the method according to aspects of the present disclosure. The data structure 800 is substantially similar to that described above and is suitable for use as any level (e.g., L0 level 210, L1 level 212, or L2 level 214) of an address map 202 of an index.

Figure 13:
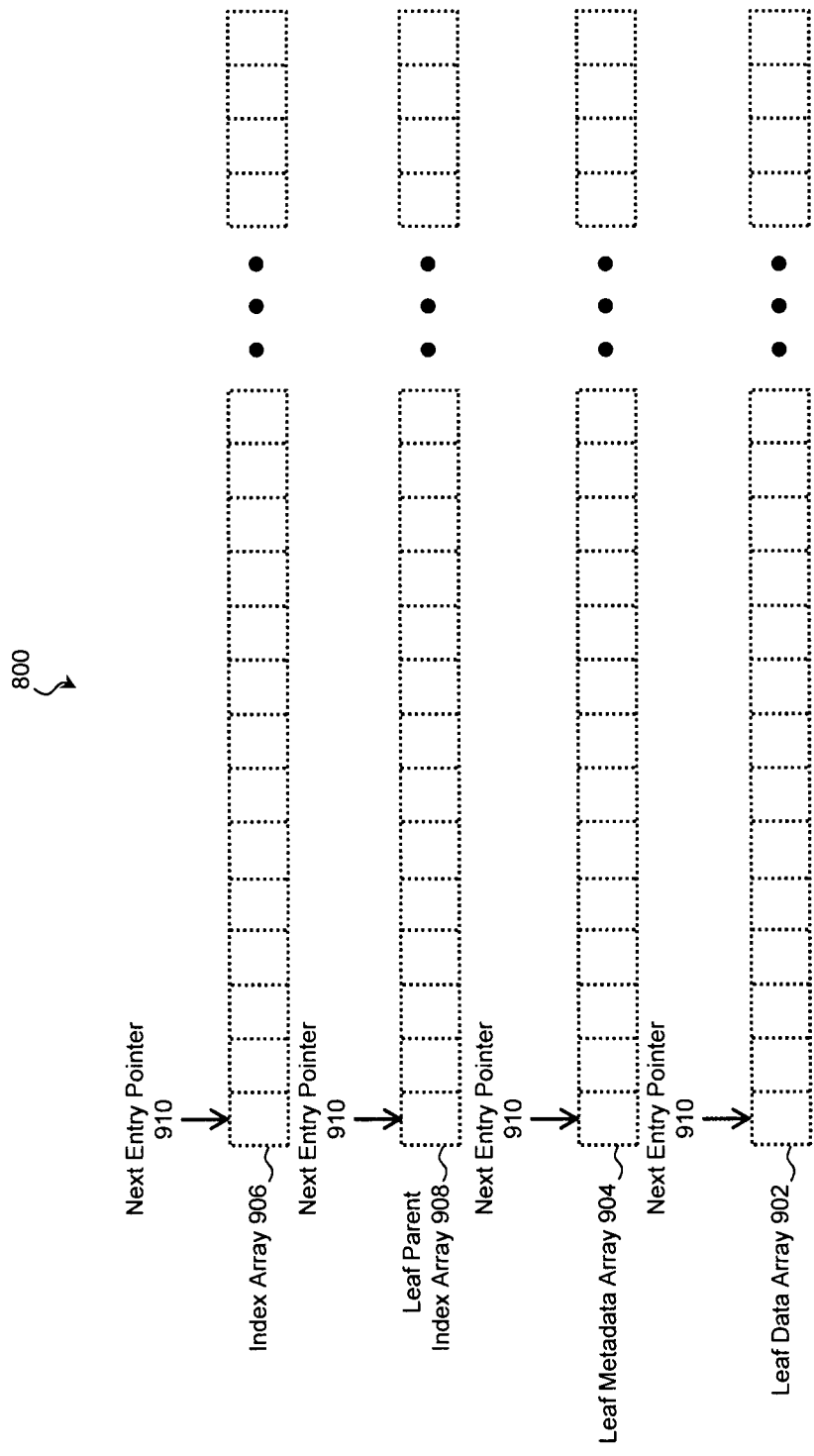
FIGS. 13-18 are memory diagrams of the data structure at various stages of the method according to aspects of the present disclosure.
Figure 14:
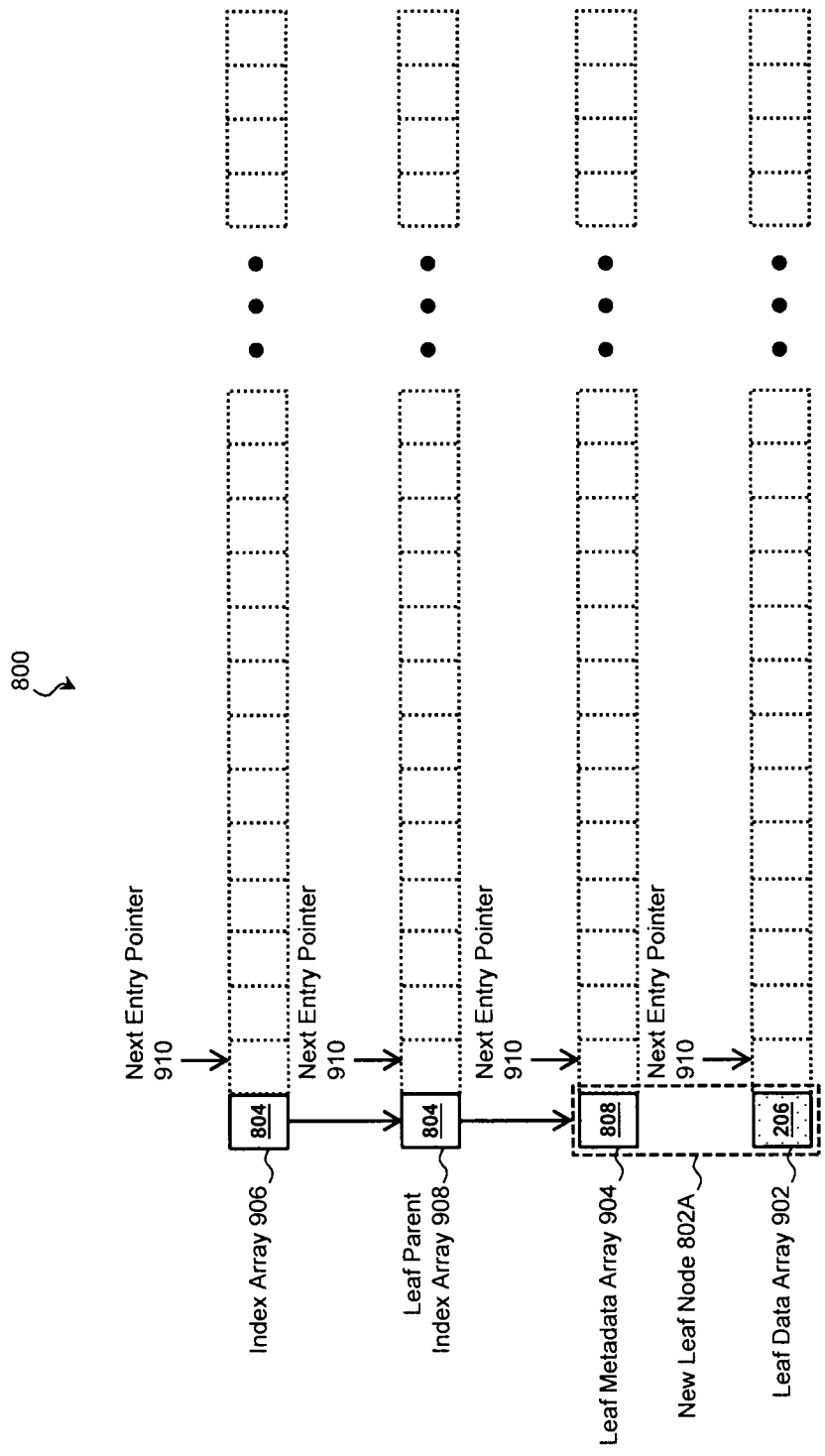
Figure 15:
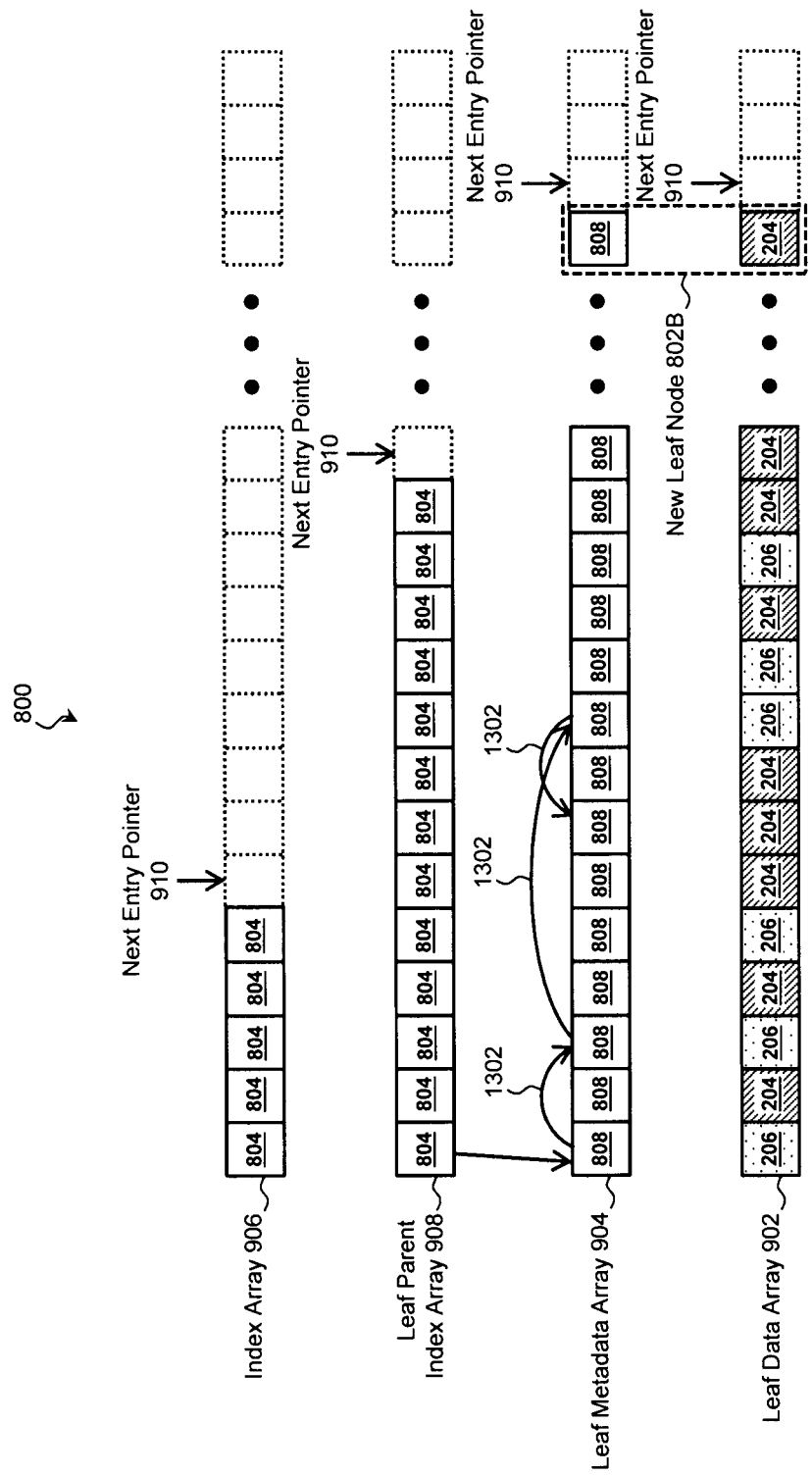

Referring first to block 1002 of FIG. 12A and to FIG. 13, a storage controller 114 or other element of a storage system 102 initializes a set of arrays within a pool of memory. The set of arrays may include a leaf data array 902, a leaf metadata array 904, a leaf parent index array 906, and/or an index array 906, each substantially as described above. The size of the arrays may be selected based on the maximum number of leaf nodes 802 to be stored, the available memory, and/or any other consideration. It is noted that in the worst-case scenario, each intra-level index node 804 will have exactly the minimum number of associated child nodes allowed by the lower bound. Thus, in the worst case, for any number ("N") of leaf nodes 802, the leaf parent index array 908 will have N/L nodes where L is the lower bound on the number of associated child nodes. The index array 906 includes a sufficient number of elements for the nodes immediately above the leaf parent index array 908 (i.e., at most round_up($N/L^2$) nodes), then the level above that (i.e., at most round_up($N/L^3$) nodes), and so on, up through the top-most level below the root of the tree, which has a number of nodes between the lower bound and the upper bound. Because the size relationship for each of these arrays is known, the amount of memory required to support a given number of leaf nodes 802 or the maximum number of leaf nodes 802 supported by a given amount of memory can be determined.

In initializing the arrays, the storage controller 114 or other element of the storage system may initialize a set of next entry pointers 910 where each next entry pointer 910 records the first unused location in a respective array.

Once the arrays have been initialized, the storage system 102 may begin to add nodes to the data structure 800. Referring to block 1004 of FIG. 12A and to FIG. 14, the storage controller 114 or other element of the storage system 102 adds a first leaf node (labeled leaf node 802A) by inserting a data range descriptor 204 or index node 206 of the new leaf node 802A in the first unused entry in the leaf data array 902 and inserting metadata including a next sibling pointer 808 in the first unused entry in the leaf metadata array 904 as specified by the next entry pointers 910. The next sibling pointer 808 of the new leaf node 802A is set to NULL or another such value indicating the end of the new leaf node's group of nodes. The next entry pointers 910 are then updated to point to the next unused entries.

For the first leaf node, an intra-level index node 804 is created in each index array without regard for the lower bound. Referring to block 1006 of FIG. 12A and to FIG. 4 the storage controller 114 or other element of the storage system 102 adds an intra-level index node 804 in the first unused entry of the leaf parent index array 908 and is the index array 906. The child pointers 814 of the intra-level index nodes 804 are set to the sole node in the level below and the minimum leaf pointers 816 (where applicable) of the intra-level index nodes 804 are set to point to the sole leaf node 802. The next sibling pointers 808 are set to NULL or another such value indicating the end of a group of associated nodes. The next entry pointers 910 are then updated to point to the next unused entries.

Inserting subsequent leaf nodes is described with reference to blocks 1008-1016. Leaf nodes 802 may be added to the data structure 800 when initializing the respective level of the address map as described in blocks 306-314 of FIG. 3, in response to received data transactions as described in block 302 of FIG. 3, and/or in response to any other suitable event. Referring to block 1008 of FIG. 12A and to FIG. 15, the storage controller 114 or other element of the storage system 102 adds the subsequent leaf node by inserting a data range descriptor 204 or index node 206 of the new leaf node (labeled 802B) in the first unused entry in the leaf data array 902 and inserting metadata including a next sibling pointer 808 in the first unused entry in the leaf metadata array 904 as specified by the next entry pointers 910. The next entry pointers 910 are then updated to point to the next unused entries.

Referring to block 1010 of FIG. 12A, the storage controller 114 or other element searches the data structure 800 according to the address in the first address space of the new leaf node 802B to determine its place in the search order among the existing leaf nodes 802. Based on the determination, the new leaf node 802B is added to a group of existing leaf nodes 802 using the next sibling pointers. Arrows 1302 represent the next sibling pointers 808 of the leaf nodes 802 in the group.

Figure 16:
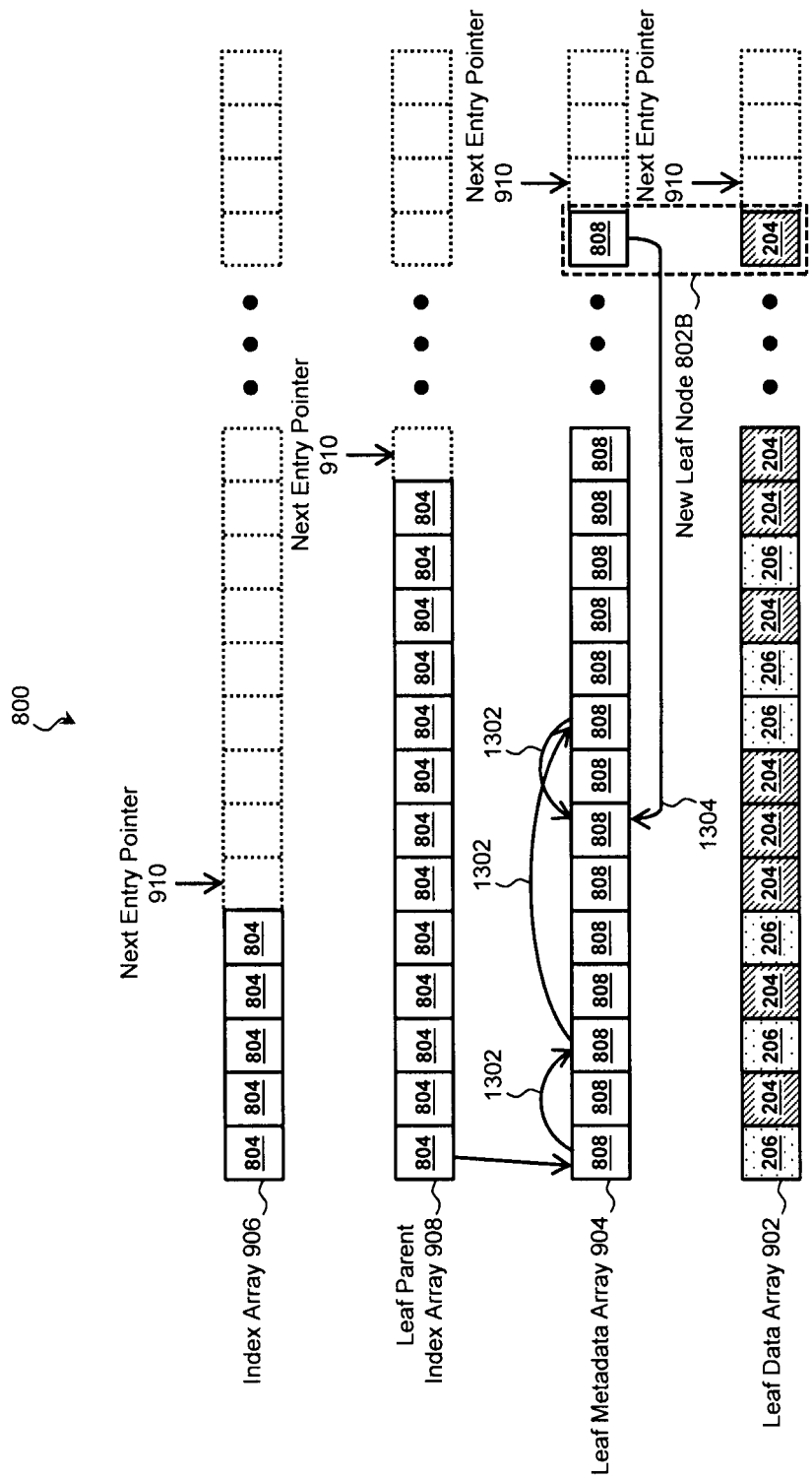

Referring to block 1012 of FIG. 12A and to FIG. 16, the storage controller 114 or other element sets the next sibling pointer 808 of the new leaf node 802B to point to a successor leaf node 802 in the group that immediately follows the new leaf node 802B in the search order, if one exists as shown by arrow 1304. Conversely, if the new leaf node 802B is the last leaf node in the group according to the search order, the next sibling pointer 808 of the new leaf node 802B is set to NULL or another such value indicating the end of the group.

Figure 17:
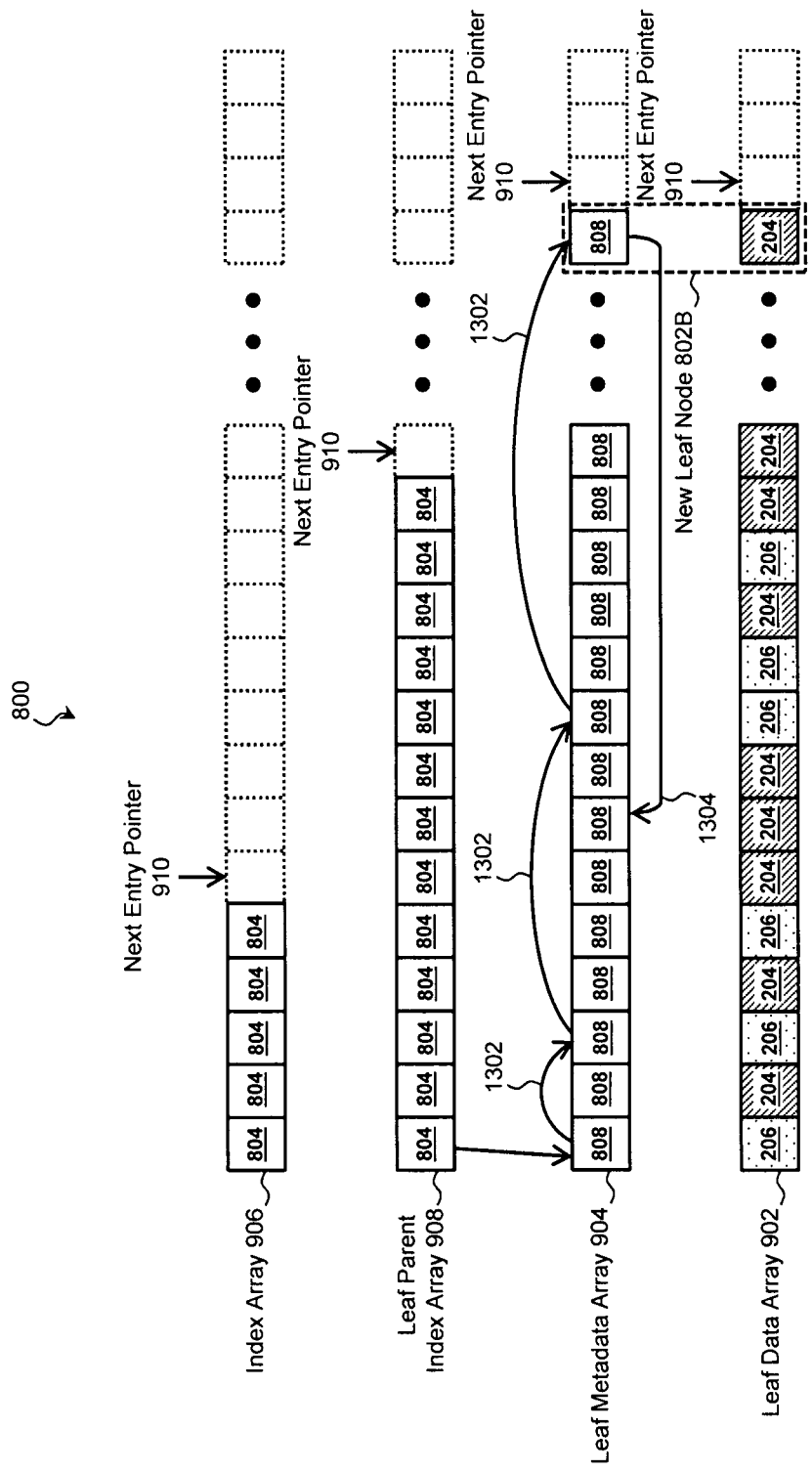

Referring to block 1014 of FIG. 12A and referring to FIG. 17, the storage controller 114 or other element sets the next sibling pointer 808 of a predecessor leaf node 802 in the group that immediately precedes the new leaf node 802B in the search order to point to the new leaf node 802B, if such a predecessor leaf node exists.

Otherwise, referring to block 1016, the new leaf node 802B is the first node in the group according to the search order, and the storage controller 114 or other element sets the child pointer 814 of the associated intra-level index node 804 in the level immediate above it (leaf parent index array 908) to point to the new leaf node 802B. This may include updating minimum leaf pointers 816 of one or more intra-level index nodes 804 to point to the new leaf node 802B.

Referring to block 1018 of FIG. 12A, the storage controller 114 or other element determines whether adding the new leaf node 802B to the group causes the associated intra-level index node 804 to have more child nodes than the upper bound permits. It is noted that by having upper and lower bounds that are different, not every new node causes changes to propagate up the hierarchy. This may reduce the overhead associated with adding and/or deleting nodes. If the new leaf node 802B causes the group to the upper bound, the group may be split into two groups.

Splitting a group of leaf nodes 802 or intra-level index nodes 804 into a first group and a second group that both comply with the upper and lower bounds is described with reference to blocks 1020-1026 of FIG. 12B. The existing intra-level index node that governs the old group (labeled node 804A in FIG. 18) already points to the first node in search order of the first group. Referring to block 1020 of FIG. 12B and to FIG. 18, the storage controller 114 or other element sets the next sibling pointer 808 of the last leaf node 802 (according to the search order) in the first group to NULL or another such value indicating the end of the first group of nodes.

Figure 18:
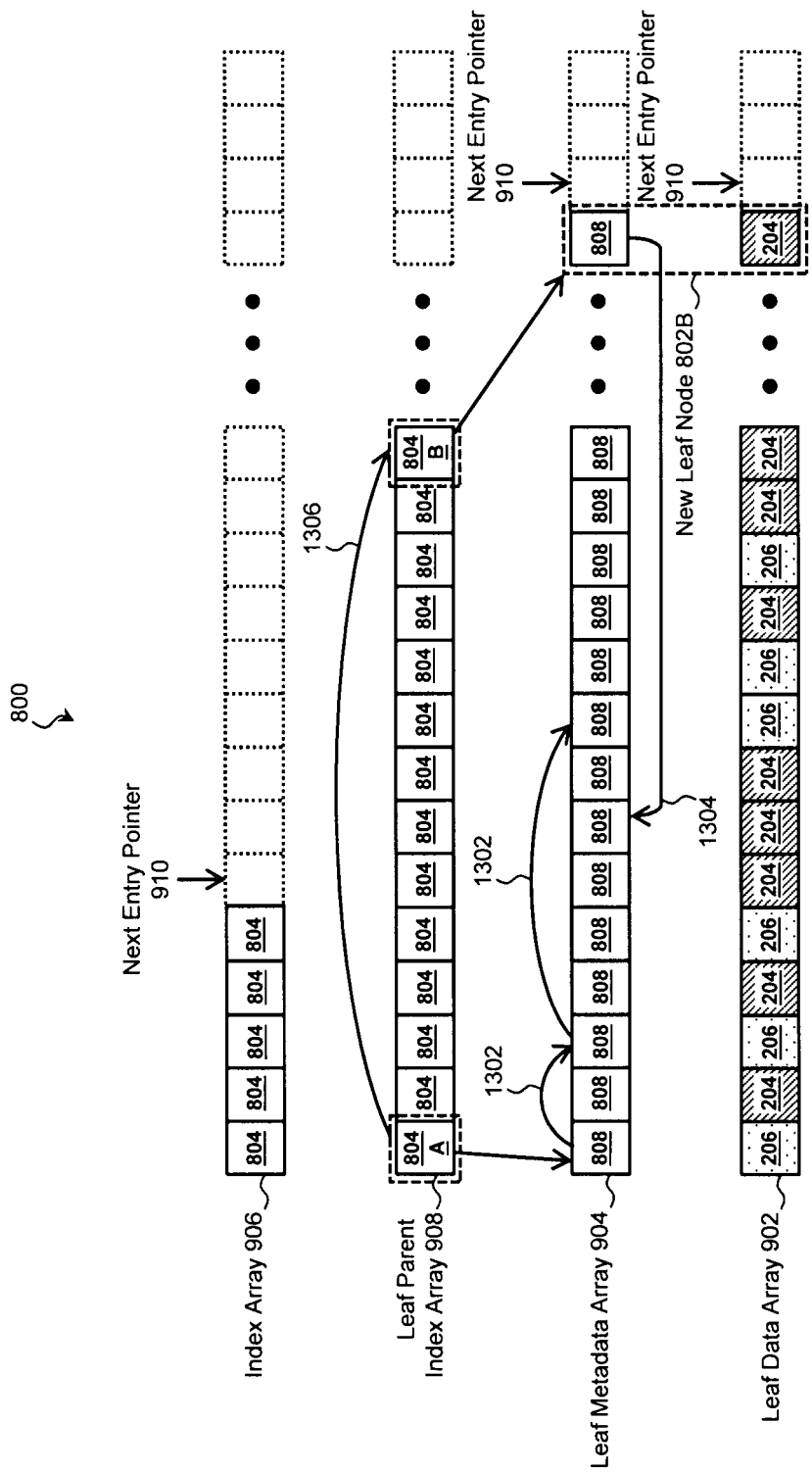

Referring to block 1022 of FIG. 12B and referring still to FIG. 18, the storage controller 114 or other element creates a new intra-level index node (labeled node 804B) to correspond to the second group of nodes. The new intra-level index node 804B is stored in the first unused entry in the index array 906, which is the leaf parent index array 908 in the illustrated embodiment. The next entry pointer 910 may be updated to point to the next unused entry in this index array.

Referring to block 1024 of FIG. 12B, the storage controller 114 or other element sets the child pointer 814 of the new intra-level index node 804B to point to the first leaf node 802 (according to the search order) in the second group and sets the next sibling pointer 808 of the new intra-level index node 804B that governs the second group to whatever value was stored in the next sibling pointer 808 in the intra-level index node 804A that governs the first group. Referring to block 1026 of FIG. 12B, the storage controller 114 or other element sets the next sibling pointer 808 of the intra-level index node 804A that governs the first group to point to the intra-level index node 804B that governs the second group as shown by arrow 1306.

Adding a new intra-level index node 804B in blocks 1020-1026 may cause the group that contains intra-level index nodes 804A and 804B to have too many nodes. Accordingly, in block 1028, the storage controller 114 or other element determines whether adding the new intra-level index node 804B causes the associated intra-level index node 804 in the next level up to have more child nodes than the upper bound permits. This may be performed substantially as described in block 1018. If so, the storage controller 114 or other element splits the group of intra-level index nodes 804 by adding another intra-level index node 804 in the next level up substantially as described in blocks 1020-1026. The process of blocks 1020-1028 may be repeated until the entire memory structure complies with the upper bound, and may include creating a new index level at the top of the data structure.

By selecting the proper upper and lower bounds, the process of blocks 1020-1028 need not be performed every time a new leaf node 802 is added. Similarly, not every intra-level index node 804 added to an index array 906 needs to cause changes in each index array 906 above it. Thus, the present technique may be used to reduce the overhead associated with adding nodes to the memory structure.

At any time during this process the data structure 800 may be used to perform lookups, such as those that may be used to translate addresses in response to received transactions. Referring to block 1030 of FIG. 12B, in response to receiving a data transaction that references an address in the first address space, the storage controller 114 or other element of the storage system 102 searches the data structure 800 using the address to find the associated leaf node in data structure 800. The search may begin by comparing the address to the first intra-level index node 804 in the index array 906. If the address being searched matches the address in the leaf data array 902 entry indexed by the minimum leaf pointer 816 of the first intra-level index node 804, the search ends and the leaf data array 902 entry just examined is used to translate the address being searched. If the address being searched is greater than the address in the leaf data array 902 entry indexed by the minimum leaf pointer 816 of the first intra-level index node 804, the next sibling pointer 808 in the first intra-level index node 804 is used to move to the next index node in the index array 906 at the same level as the first intra-level index node 804. If the address being searched matches the address in the leaf data array 902 entry indexed by the minimum leaf pointer 816 of the next index node, the search ends and the leaf data array 902 entry just examined is used to translate the address being searched. If the address being searched is less than the address in the leaf data array 902 entry indexed by the minimum leaf pointer 816 of the next index node, the search moves back to the first intra-level index node 804 and moves down to the next level of the data structure 800 by accessing the index node 804 indexed by the child pointer 814 of the first intra-level index node 804 where the same search process begins anew, such as by recursion. If the address being searched is greater than the address in the leaf data array 902 entry indexed by the minimum leaf pointer 816 of the next index node, the search continues to move along the same index level by following the next sibling pointer 808 in the next index node where the process of checking the address being searched is repeated by finding either a match, backing up and moving down (less than), or moving to the next sibling (greater than).

Referring to block 1032 of FIG. 12B, the storage controller 114 or other element of the storage system 102 returns a value based on the corresponding leaf node 802. If the leaf node 802 includes a data range descriptor 204, the value may include an address in the second address space contained in the data range descriptor. If the leaf node 802 includes an index node 206 pointing to another level of the address map 202, the value may include an index page 208 in a lower level of the address map 202 corresponding to the address being searched. Because the data structure 800 is structured as a search tree, the average search time may be on order of $O(\log(N))$, which is a substantial improvement over a conventional linked-list.

Figure 19:
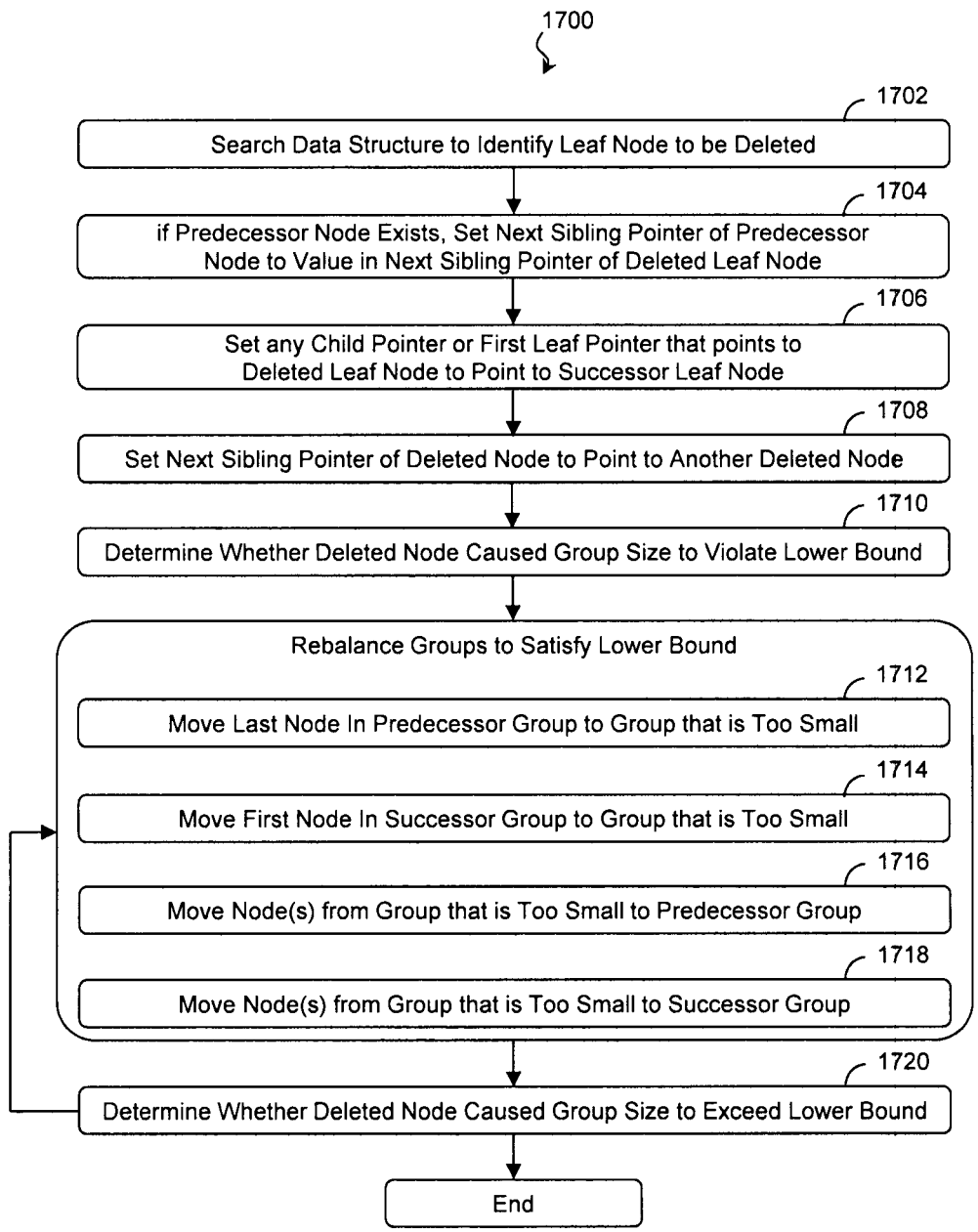
FIG. 19 is a flow diagram of a method for deleting a node from a data structure according to aspects of the present disclosure.
Figure 20:
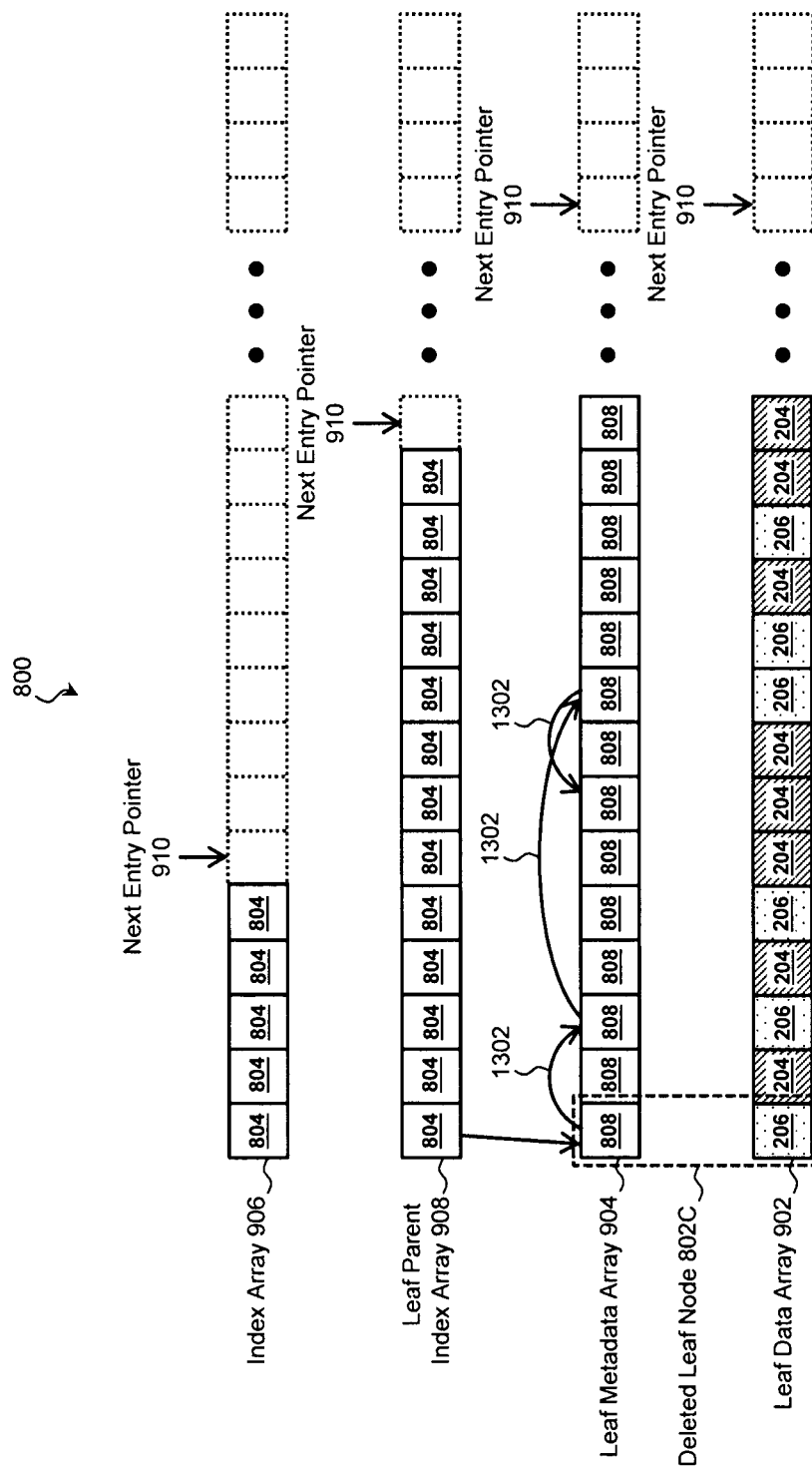
FIGS. 20 and 21 are memory diagrams of the data structure at various stages of the method of deleting the node according to aspects of the present disclosure.
Figure 21:
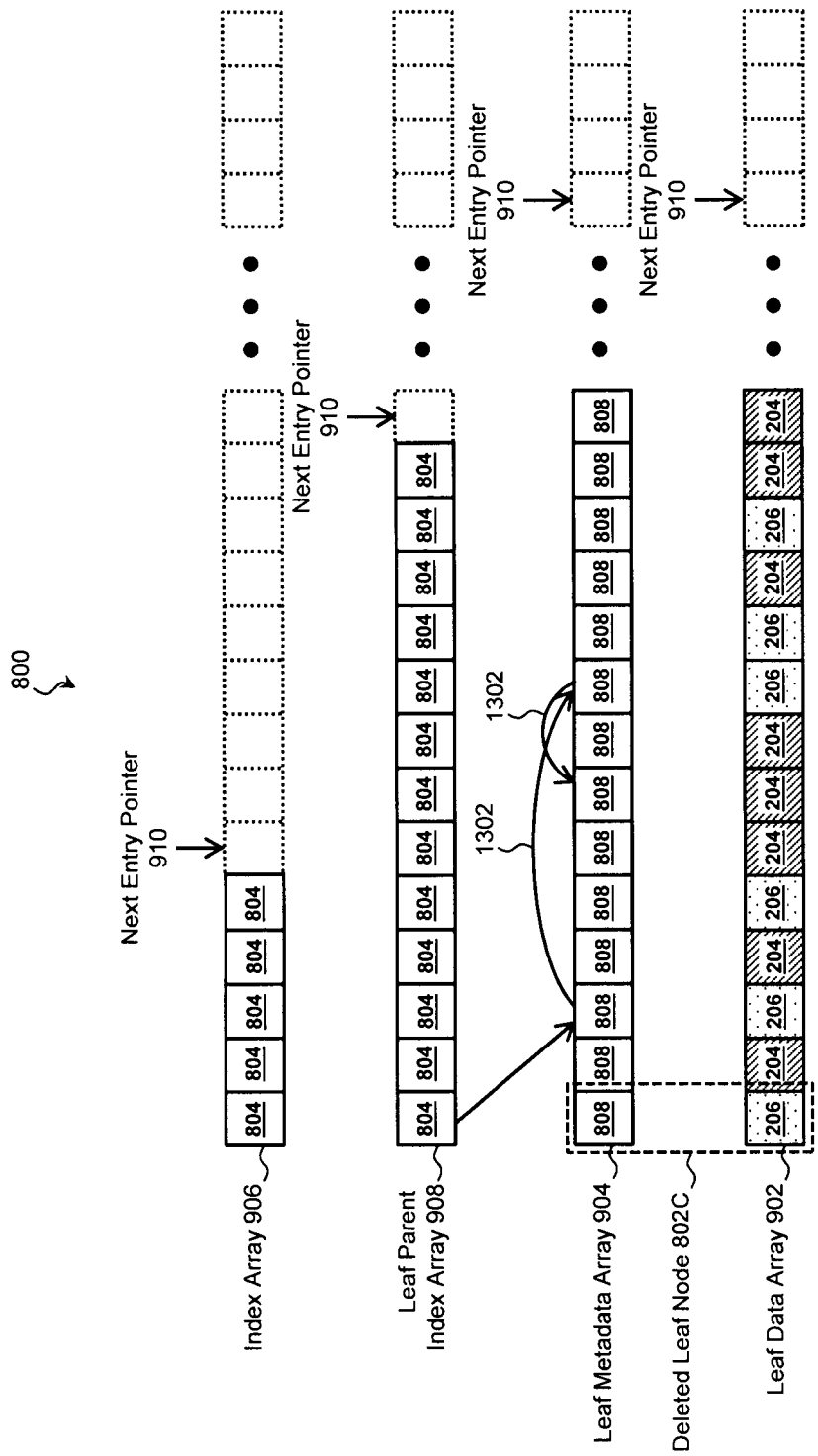

While adding nodes may be emphasized over deleting nodes, the present technique supports deleting nodes in their entirety as well as removing them from the sort order without deleting the node. Tracking of the deleted nodes simplifies the task of knowing which entries in the leaf data array 902 are no longer in use and should not be archived and/or otherwise copied during the L0 to L1 merge of process 308. An example is described with reference to FIGS. 19-21. FIG. 19 is a flow diagram of a method 1700 for deleting a node from a data structure, such as data structure 800, according to aspects of the present disclosure. It is understood that additional steps can be provided before, during, and after the steps of method 1700, and that some of the steps described can be replaced or eliminated for other embodiments of the method. FIGS. 20 and 21 are memory diagrams of the data structure 800 at various stages of the method of deleting the node according to aspects of the present disclosure. The data structure 800 is substantially similar to that described above and is suitable for use as any level (e.g., L0 level 210, L1 level 212, or L2 level 214) of an address map 202 of an index.

Referring to block 1702 of FIG. 19 and to FIG. 20, upon determining that a leaf node 802 corresponding to an address in the first address space is to be deleted, the storage controller 114 or other element searches the data structure 800 according to the address in the first address space to identify the corresponding leaf node (labeled leaf node 802C). Rather than deleting the leaf node 802B entirely, in some embodiments, it is sufficient to remove it from the tree structure by modifying the pointers of the other nodes. The deleted leaf node 802C may then be added to a linked list of deleted nodes.

The storage controller 114 or other element removes the leaf node 802C to be deleted from its corresponding group by modifying the pointers of the other leaf nodes 802 in the group. Referring to block 1704 of FIG. 19, if the deleted leaf node 802C has a predecessor leaf node 802 immediately preceding it (according to the search order) in the group, the storage controller 114 or other element sets the next sibling pointer 808 of the predecessor leaf node 802 to whatever value was stored in the next sibling pointer 808 of the deleted leaf node 802C. In this way, the next sibling pointer 808 of the predecessor leaf node 802 will point to a leaf node 802 that immediately follows the deleted leaf node 802C, if one exists, and otherwise will be set to NULL or another such value indicating the end of the group.

Referring to block 1706 of FIG. 19 and to FIG. 21, the storage controller 114 or other element sets any child pointer 814 or minimum leaf pointer 816 of any intra-level index node(s) 804 that previously pointed to the deleted leaf node 802C to point to a successor leaf node 802 in the group that immediately follows the deleted leaf node 802C according to the search order.

Referring to block 1708 of FIG. 19, the storage controller 114 or other element adds the deleted leaf node 802C to a linked list of deleted nodes by setting the next sibling pointer 808 of the node to point to another deleted leaf node 802 if one exists or to NULL or another value indicating the end of the group otherwise.

Similar to adding a new node, deleting a node in a group may cause an intra-level index node 804 that governs the group to have fewer nodes that the lower bound permits. Referring to block 1710 of FIG. 19, the storage controller 114 or other element determines whether the deleted node causes the associated group to fail to meet the lower bound. If so, the data structure 800 may be rebalanced using one of the following techniques.

In some examples, a node is moved from a predecessor group that is earlier in the search order provided the predecessor group will still meet the lower bound after the node is removed. Referring to block 1712 of FIG. 19, if a predecessor group that is prior (according to the search order) to the group that fails the lower bound will meet the lower bound after a node is removed, the storage controller 114 or other element moves the last node from the predecessor group to the group that fails to meet the lower bound. To do this, the storage controller 114 may set the child pointer 814 of the intra-level index node 804 associated with the failing group to point to the last node in the predecessor group. The storage controller may then set the next sibling pointer 808 of the last node in the predecessor group to point to the first node in the failing group according to the search order. Finally, the storage controller may remove the last node from the predecessor group by setting the next sibling pointer 808 of a node in the predecessor group that immediately precedes the last node to NULL or another such value indicating that this node is now the last node in the predecessor group. These processes may be performed in any order.

In further examples, a node is moved from a successor group that is later in the search order provided the successor group will still meet the lower bound after the node is removed. Referring to block 1714 of FIG. 19, if a successor group that is later (according to the search order) to the group that fails the lower bound will meet the lower bound after a node is removed, the storage controller 114 or other element moves the first node in the search order from the successor group to the group that fails to meet the lower bound. To do this, the storage controller 114 may set the child pointer 814 of the intra-level index node 804 associated with the successor group to point to a node that follows the first node in the successor group. The storage controller may then set the next sibling pointer 808 of the last node in the failing group to point to the first node in the successor group. Finally, the storage controller may set the next sibling pointer 808 of the first node in the successor group (which is now part of the failing group) to NULL or another such value indicating that this node is now the last node in the failing group. These processes may be performed in any order.

In further examples, the node or nodes of the failing group may be moved from the failing group to the predecessor group provided the predecessor group will still meet the upper bound with the additional node(s) as shown in block 1716 of FIG. 19. To do this, the storage controller 114 may set the next sibling pointer 808 of the last node in the predecessor group to point to the first node in the failing group and may delete the intra-level index node 804 associated with the failing group.

In yet further examples, the node or nodes of the failing group may be moved from the failing group to a successor group provided the successor group will still meet the upper bound with the additional node(s) as shown in block 1718 of FIG. 19. To do this, the storage controller 114 may set the child pointer 814 of the intra-level index node 804 associated with the successor group to point to the first node in the failing group. The storage controller 114 may set the next sibling pointer 808 of the last node in the failing group to point to the first node in the successor group and may delete the intra-level index node 804 associated with the failing group. These processes may be performed in any order.

Deleting an intra-level index node 804 in blocks 1716 or 1718 may cause the group that contained the intra-level index node 804 to have too few nodes. Accordingly, in block 1720, the storage controller 114 or other element determines whether deleting an intra-level index node caused the associated intra-level index node 804 in the next level up to have fewer child nodes than the lower bound permits. This may be performed substantially as described in block 1710. If so, the storage controller 114 or other element rebalances the data structure 800 substantially as described in any of blocks 1712-1718. The process of blocks 1712-1720 may be repeated until the entire memory structure complies with the lower bound.

As will be recognized, the address maps of the present technique provide significant advantages. The structure of the address maps provides efficient searching and balances searchability with memory size. By recognizing that nodes are added more often than nodes are deleted, the present structure may emphasize efficient additions, making it well-suited to mapping addresses between address spaces. Furthermore, by selecting appropriate upper and lower bounds on group size, not every node addition or deletion will propagate changes to other levels and arrays. This reduces overhead associated with changes. Of course, these advantages are merely exemplary, and no particular advantage is required for any particular embodiment.

In various embodiments, the technique is performed by using various combinations of dedicated, fixed-function computing elements and programmable computing elements executing software instructions. Accordingly, it is understood that any of the steps of method 300, method 1000, and method 1700 may be implemented by a computing system using corresponding instructions stored on or in a non-transitory machine-readable medium accessible by the processing system. For the purposes of this description, a tangible machine-usable or machine-readable medium can be any apparatus that can store the program for use by or in connection with the instruction execution system, apparatus, or device. The medium may include non-volatile memory including magnetic storage, solid-state storage, optical storage, cache memory, and/or Random Access Memory (RAM).

Thus, the present disclosure provides a method, a computing device, and a non-transitory machine-readable medium for maintaining address maps and for allocating memory between the maps. In some embodiments, the method includes initializing a set of arrays for storing a hierarchical level of an address map that maps a first address space to a second address space. A leaf node that maps an address in the first address space to an address in the second address space is added to a leaf array of the set of arrays, and an index array of the set of arrays includes an index node associated with a first group of nodes that includes the leaf node. In response to the adding of the leaf node, it is determined whether a size of the first group of nodes exceeds an upper bound. Upon determining that the size of the group of nodes exceeds the upper bound, the first group of nodes is divided into a second group of nodes and a third group of nodes that each complies with the upper bound. In some such embodiments, the leaf node is a first leaf node and adding the first leaf node includes at least one of: setting a next sibling pointer of the first leaf node to point to a second leaf node that is after the first leaf node according to a search order, setting a next sibling pointer of a third leaf node that is before the first leaf node according to the search order to point to the first leaf node, and/or setting a child pointer of the index node to point to the first leaf node. In some such embodiments, the dividing of the first group of nodes is performed such that the second group of nodes and the third group of nodes meet the upper bound and a lower bound that is different from the upper bound.

In further embodiments, the non-transitory machine readable medium has stored thereon instructions for performing a method comprising machine executable code. The code, when executed by at least one machine, causes the machine to: allocate a memory structure containing at least one leaf array having stored therein a first leaf node mapping an address in a first address space to an address in a second address space, wherein the memory structure further contains an index array having stored therein an index node associated with a group of nodes that includes the first leaf node; add a second leaf node to the memory structure; modify the group of nodes to include the second leaf node; determine whether a size of the group of nodes exceeds an upper bound; and based on the size of the group of nodes exceeding the upper bound, split the group of nodes into a plurality of groups of nodes that are each within the upper bound. In some such embodiments, the memory structure corresponds to a first level of an address map, and wherein the second leaf node maps another address in the first address space to a second level of the address map. In some such embodiments, the at least one leaf array includes a leaf data array that has stored therein a data range descriptor of the first leaf node that maps the address in the first address space to the address in the second address space, and the at least one leaf array further includes a leaf metadata array that has stored therein a pointer of the first leaf node.

In yet further embodiments, the computing device comprises a memory containing machine readable medium comprising machine executable code having stored thereon instructions for performing a method of address mapping and a processor coupled to the memory. The processor is configured to execute the machine executable code to cause the processor to: initialize a set of arrays for storing a portion of an address map that maps an address in a first address space to an address in a second address space; add a leaf node that maps the address in the first address space to the address in the second address space to a leaf array of the set of arrays, wherein an index array of the set of arrays includes an index node associated with a first group of nodes that includes the leaf node; in response to the adding of the leaf node, determine whether a size of the first group of nodes exceeds an upper bound; and upon determining that the size of the group of nodes exceeds the upper bound, divide the first group of nodes into a second group of nodes and a third group of nodes.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
utilizing, by a computing device, a first array of data lookup entries and a second array of a plurality of metadata entries for maintaining an ordering among the data lookup entries in the first array using a tree structure, each of the metadata entries being associated with a corresponding level of a plurality of levels and storing:
a first data index value identifying a data lookup entry in the first array;
a first metadata index value identifying a metadata entry in a same level of the tree structure; and
a second metadata index identifying a metadata entry in a level below the corresponding level of the tree structure;
locating a data lookup entry in the first array, the data lookup entry corresponding to a lookup value, associated with a received request, from among the data lookup entries in the first array; and
processing the request in response to locating the lookup value among the data lookup entries in the first array.

2. The method of claim 1, wherein:
processing the request comprises translating a first address in a first address space to a second address in a second address space using the located data lookup entry.

3. The method of claim 2, wherein the first address is located within a range of addresses in the first address space identified by the located data lookup entry.

4. The method of claim 1, further comprising:
updating the tree structure to add a new data lookup entry to the tree structure while maintaining the ordering among the data lookup entries in the first array.

5. The method of claim 4, wherein updating the tree structure comprises rebalancing the tree structure.

6. The method of claim 1, wherein each of the metadata entries in a lowest level of the plurality of levels has a same position in the second array as a corresponding data lookup entry in the first array.

7. The method of claim 1, wherein a number of metadata entries is between a first predetermined number and a second predetermined number.

8. The method of claim 6, wherein the lowest level is a leaf level.

9. The method of claim 1, further comprising, maintaining a list of data entries deleted from the tree structure.

10. A non-transitory machine readable medium having stored thereon instructions for performing a method comprising machine executable code which when executed by at least one machine, causes the machine to:
utilize a first array of lookup nodes and a second array of a plurality of metadata nodes for maintaining an ordering among the lookup nodes in the first array using a multi-level structure, each of the metadata nodes being associated with a corresponding level of a plurality of levels and storing:
a first data index pointing to a position of a lookup node in the first array;
a first metadata index pointing to a position of a metadata node in a same level of the multi-level structure; and
a second metadata index pointing to a position of a metadata node in a level below the corresponding level of the multi-level structure;
locate a lookup node in the first array, the lookup node corresponding to a lookup value, associated with a received data transaction, from among the lookup nodes in the first array; and
process the data transaction in response to locating the lookup value among the lookup nodes in the first array.

11. The non-transitory machine readable medium of claim 10, wherein:
to process the data transaction, the machine translates a first address in a first address space to a second address in a second address space using the located lookup node.

12. The non-transitory machine readable medium of claim 11, wherein the first address is located within a range of addresses in the first address space identified by the located lookup node.

13. The non-transitory machine readable medium of claim 10, the machine further:
updates the multi-level structure to add a new lookup node to the multi-level structure while maintaining the ordering among the lookup nodes in the first array.

14. The non-transitory machine readable medium of claim 13, wherein updating the multi-level structure comprises rebalancing the multi-level structure.

15. The non-transitory machine readable medium of claim 10, wherein each of the metadata nodes in a lowest level of the plurality of levels has a same position in the second array as a corresponding one of the lookup nodes in the first array.

16. The non-transitory machine readable medium of claim 15, wherein a number of first metadata nodes is between a first predetermined number and a second predetermined number.

17. A computing device comprising:
a memory containing machine readable medium comprising machine executable code having stored thereon instructions for performing a method of processing requests; and a processor coupled to the memory, the processor configured to execute the machine executable code to cause the processor to:
utilize a first array of data lookup entries and a second array of metadata entries for maintaining an ordering among the data lookup entries in the first array using a tree structure, each of the metadata entries being associated with a corresponding level of a plurality of levels and storing a first data index value identifying a data lookup entry by its position in the first array, a first metadata index value identifying a metadata entry in a same level of the tree structure by its position in the second array, and a second metadata index value identifying a metadata entry in a level below the corresponding level of the tree structure by its position in the second array;
locate a data lookup entry in the first array, the data lookup entry corresponding to a lookup value, associated with a received request, from among the data lookup entries; and
process the request in response to locating the lookup value among the data lookup entries.

18. The computing device of claim 17, wherein:
to process the request the processor translates a first address in a first address space to a second address in a second address space using the located data lookup entry; and
the first address is located within a range of addresses in the first address space identified by the located data lookup entry.

19. The computing device of claim 17, wherein the processor is further caused to:
update the tree structure to add a new data lookup entry to the tree structure while maintaining the ordering among the data lookup entries in the first array.

20. The computing device of claim 19, wherein to update the tree structure the processor rebalances the tree structure.

* * * * *